US010863193B2

(12) United States Patent
Chao et al.

(10) Patent No.: US 10,863,193 B2
(45) Date of Patent: Dec. 8, 2020

(54) BUFFER RESTRICTION DURING MOTION VECTOR PREDICTION FOR VIDEO CODING

(71) Applicant: QUALCOMM Incorporated, San Diego, CA (US)

(72) Inventors: Yung-Hsuan Chao, San Diego, CA (US); Wei-Jung Chien, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/455,444

(22) Filed: Jun. 27, 2019

(65) Prior Publication Data

US 2020/0007889 A1 Jan. 2, 2020

Related U.S. Application Data

(60) Provisional application No. 62/692,388, filed on Jun. 29, 2018.

(51) Int. Cl.
*H04N 19/52* (2014.01)
*H04N 19/96* (2014.01)
*H04N 19/70* (2014.01)
*H04N 19/176* (2014.01)

(52) U.S. Cl.
CPC .......... *H04N 19/52* (2014.11); *H04N 19/176* (2014.11); *H04N 19/70* (2014.11); *H04N 19/96* (2014.11)

(58) Field of Classification Search
CPC ........ H04N 19/52; H04N 19/96; H04N 19/70; H04N 19/176; H04N 19/423; H04N 19/577; H04N 19/593; H04N 19/513
See application file for complete search history.

(56) References Cited

U.S. PATENT DOCUMENTS

2019/0082191 A1* 3/2019 Chuang ................ H04N 19/513

OTHER PUBLICATIONS

Joyce J., et al., "JVET Common Test Conditions and Software Reference Configurations", Joint Video Experts Team (JVET) of ITU-T SG 16 WP 3 and ISO/IEC JTC 1/SC 29/WG 11, JVET-J1010-v1, Apr. 10-20, 2018, 4 pages.
(Continued)

*Primary Examiner* — Nam D Pham
(74) *Attorney, Agent, or Firm* — Shumaker & Sieffert, P.A.

(57) ABSTRACT

An example device for coding video data includes a memory configured to store video data; and one or more processors implemented in circuitry and configured to: construct a motion vector predictor candidate list for a current block of the video data, the motion vector predictor candidate list identifying one or more blocks that are non-adjacent to the current block, each of the non-adjacent blocks being in a coding tree unit (CTU) including the current block or a line buffer including the current block; select a motion vector predictor from one of the blocks that is non-adjacent to the current block and in the motion vector predictor candidate list; and code motion information of the current block using the motion vector predictor.

28 Claims, 30 Drawing Sheets

(56) References Cited

OTHER PUBLICATIONS

Chen J., et al., JVET-G1001-V1 "Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 13, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7-p. 23, Paragraph 2.3.7.6, p. 17, Paragraph 2.3.5-p. 18, section 2.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix_int-evry.fr/jvet/, pp. 1-43.

Han Y., et al., "CE4-related: Improvement on Merge/Skip Mode with Line Buffer Restriction", Joint Video Exploration Team (JVET) of ITU-T SG 16 WP 3 and ISO/IEC JTC 1/SC 29/WG 11, JVET-K0350, Jul. 10-18, 2018, 6 pages.

Yang H., et al., "Description of CE4: Inter Prediction and Motion Vector Coding", Joint Video Experts Team (JVET) of ITU-T SG 16 WP 3 and ISO/IEC JTC 1/SC 29/WG 11, JVET-J1024r2, 10th Meeting: San Diego, US, Apr. 10-20, 2018, 47 pages.

Chen J., et al., "Algorithm Description of Joint Exploration Test Model 1," Joint Video Exploration Team (JVET) of ITU-T SG16 WP3 and ISO/IEC JTC1/SC29/WG 11, 1nd Meeting: Geneva, CH, Oct. 19-21, 2015, JVET-A1001, 27 pp.

Chen J., et al., "Algorithm Description of Joint Exploration Test Model 5 (JEM 5)," Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 Pages.

Chen J., et al., "Algorithm Description of Joint Exploration Test Model 6 (JEM 6)," Joint Video Exploration Team, JVET-F1001-v2, Mar. 31-Apr. 7, 2017, 48 Pages.

Ergen S., "ZigBee/IEEE 802.15.4 Summary", Sep. 10, 2004, 37 pp.

"Euclidean Distance," Wikipedia, Accessed on Apr. 14, 2018, accessed from https://en.wikipedia.org/wiki/Euclidean_distance, 4 pp.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 pp.

"L1", Wikipedia, Retrieved from the Internet: https://en.wikipedia.org/wiki/L1, Sep. 16, 2019, 3 pages.

Lin J.-L., et al., "Motion Vector Coding in the HEVC Standard," IEEE Journal of Selected Topics in Signal Processing, vol. 7, No. 6, Dec. 2013, pp. 957-968.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI: 10.1109/TCSVT.2012.2221191.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages, please consider section 8.5.3.2.6 on p. 125, section 8.5.3.2.7 on pp. 126-129, and section 8.5.3.2.8 on pp. 129 and 130.

Bossen et al. "JEM Software Manual," Joint Collaborative Team on Video Coding, JCTVC—Software Manual, Aug. 3, 2016, 29 pp.

Bross, et al. "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v8, 400 pp.

\* cited by examiner

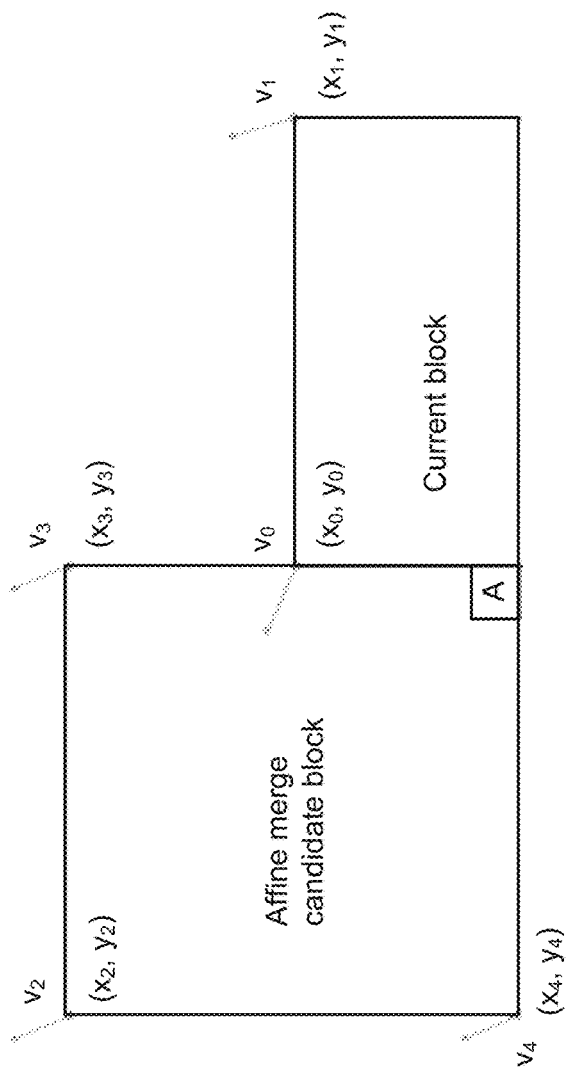
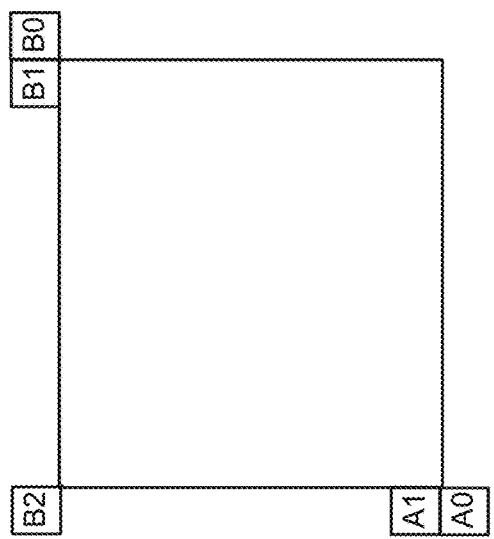
FIG. 15B
FIG. 15A

US 10,863,193 B2

BUFFER RESTRICTION DURING MOTION VECTOR PREDICTION FOR VIDEO CODING

This application claims the benefit of U.S. Provisional Application No. 62/692,388, filed Jun. 29, 2018, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to motion vector prediction. In block-based video coding, blocks may be predicted using motion vectors, e.g., during inter-prediction from a previously coded picture. The motion vectors themselves may also be coded, e.g., in merge mode or adaptive motion vector prediction (AMVP) mode. In particular, a motion vector of a current block may be predicted from motion vector predictors, that is, motion vectors of one or more neighboring blocks to the current block. The neighboring blocks may be adjacent to the current block or non-adjacent. That is, for non-adjacent blocks, there may be one or more blocks between the current block and the non-adjacent neighboring blocks. This disclosure describes techniques related to selecting certain non-adjacent blocks for use as motion vector predictor candidates, such as only those within a coding tree unit (CTU) and/or line buffer including the current block. These techniques may be applied to any of the existing video codecs, such as HEVC (High Efficiency Video Coding) or any future video coding standards.

In one example, a method of coding video data includes constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block; selecting a motion vector predictor from one of the blocks that is non-adjacent to the current block and in the motion vector predictor candidate list; and coding motion information of the current block using the motion vector predictor.

In another example, a device for coding video data includes a memory configured to store video data; and one or more processors implemented in circuitry and configured to: construct a motion vector predictor candidate list for a current block of the video data, the motion vector predictor candidate list identifying one or more blocks that are non-adjacent to the current block, each of the non-adjacent blocks being in a coding tree unit (CTU) including the current block or a line buffer including the current block; select a motion vector predictor from one of the blocks that is non-adjacent to the current block and in the motion vector predictor candidate list; and code motion information of the current block using the motion vector predictor.

In another example, a computer-readable storage medium has stored thereon instructions that, when executed, cause a processor to construct a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block; select a motion vector predictor from one of the blocks that is non-adjacent to the current block and in the motion vector predictor candidate list; and code motion information of the current block using the motion vector predictor.

In another example, a device for coding video data includes means for constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block; means for selecting a motion vector predictor from one of the blocks that is non-adjacent to the current block and in the motion vector predictor candidate list; and means for coding motion information of the current block using the motion vector predictor.

The details of one or more examples are set forth in the accompanying drawings and the description below. Other features, objects, and advantages will be apparent from the description, drawings, and claims.

BRIEF DESCRIPTION OF DRAWINGS

FIGS. 15A and 15B are conceptual diagrams illustrating example candidates for affine merge mode of JEM.

DETAILED DESCRIPTION

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, High Efficiency Video Coding (HEVC) or ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC specification, referred to as HEVC WD hereinafter, is available from phenix.int-evry.fr/jct/doc_end_user/documents/14_Vienna/wg11/JCTVC-N1003-v1.zip.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. A version of reference software, i.e., Joint Exploration Model 6 (JEM 6), is available from jvet.hhi.fraunhofer.de/svn/svn_HMJEMSoftware/tags/HM-16.6-JEM-6.0/. An algorithm description of Joint Exploration Test Model 6 (JEM6) is available in "Algorithm Description of Joint Exploration Test Model 6 (JEM6)," Joint Video Exploration Team (JVET) of ITU-T VCEG (Q6/16) and ISO/IEC MPEG (JTC 1/SC 29/WG 11), 6th Meeting, Hobart, April 2017, Doc. JVET-F1001.

Figure 1:
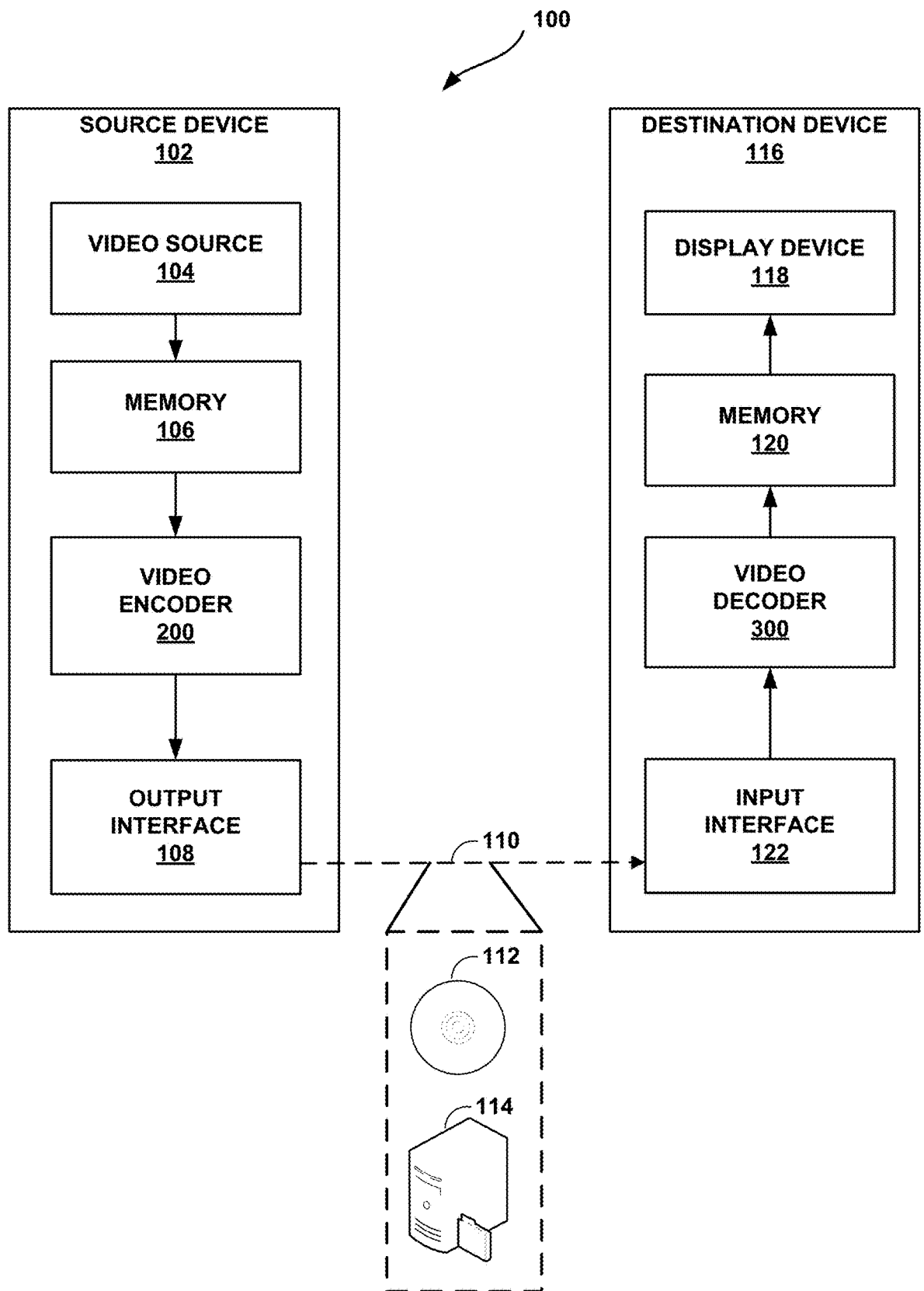
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for restricting non-adjacent blocks during motion vector prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for restricting non-adjacent blocks during motion vector prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM or VVC removes the concepts of multiple partition types, such as the separation between CUs, PUs, and TUs of HEVC. A QTBT structure of JEM or VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT or MTT structure for the luminance component and another QTBT or MTT structure for both chrominance components (or two QTBT or MTT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (i), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
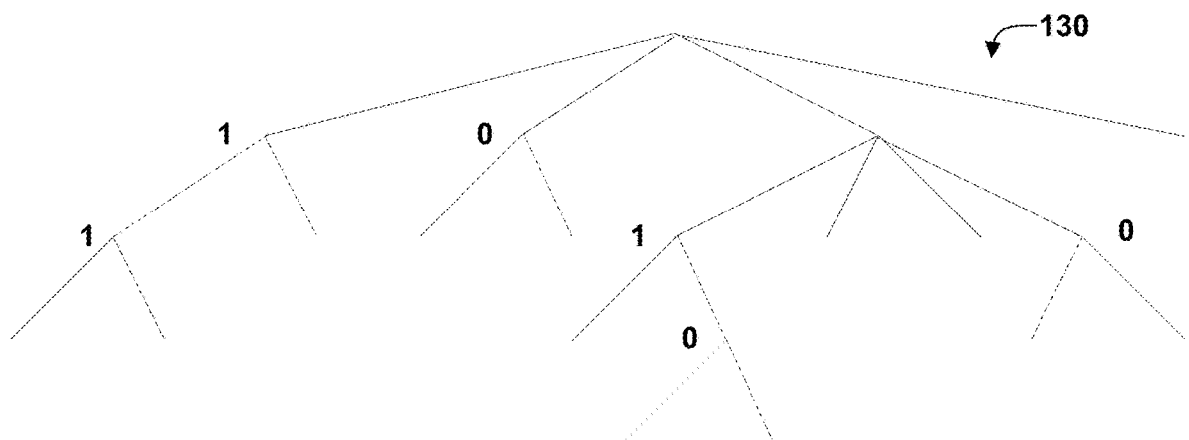
FIGS. 2A and 2B are conceptual diagrams illustrating an example quadtree binary tree (QTBT) structure, and a corresponding coding tree unit (CTU).
Figure 2B:
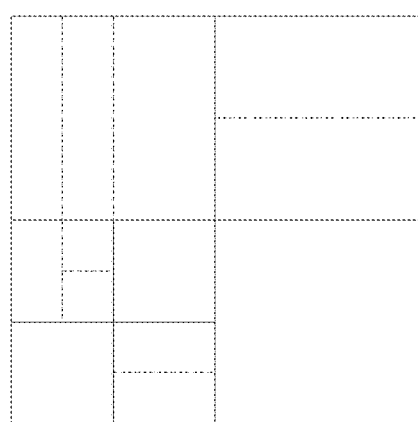

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3B:
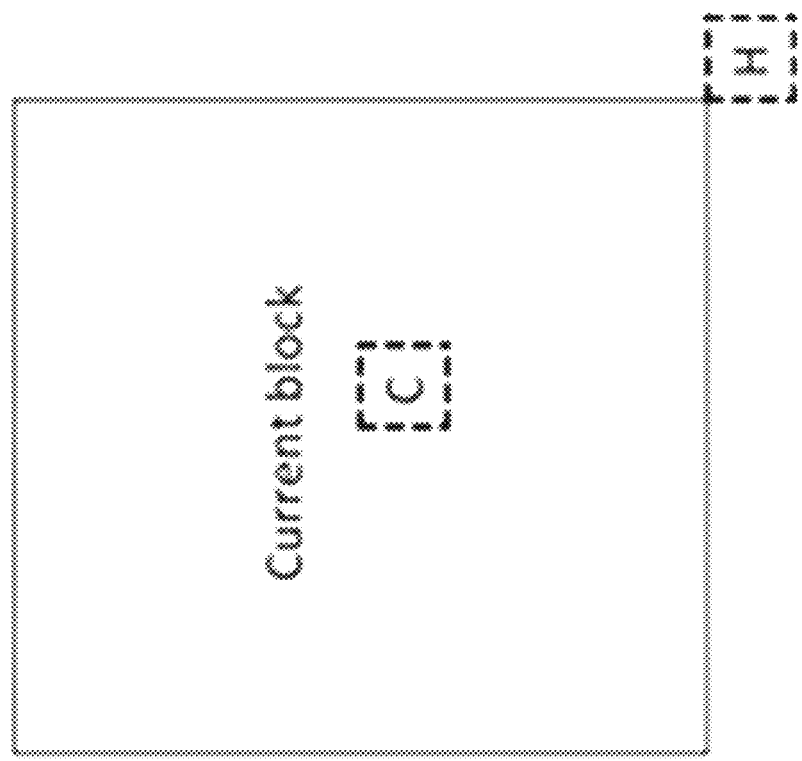
FIGS. 3A and 3B are conceptual diagrams illustrating spatial and temporal neighboring motion vector candidates for merge/skip modes.
Figure 3A:
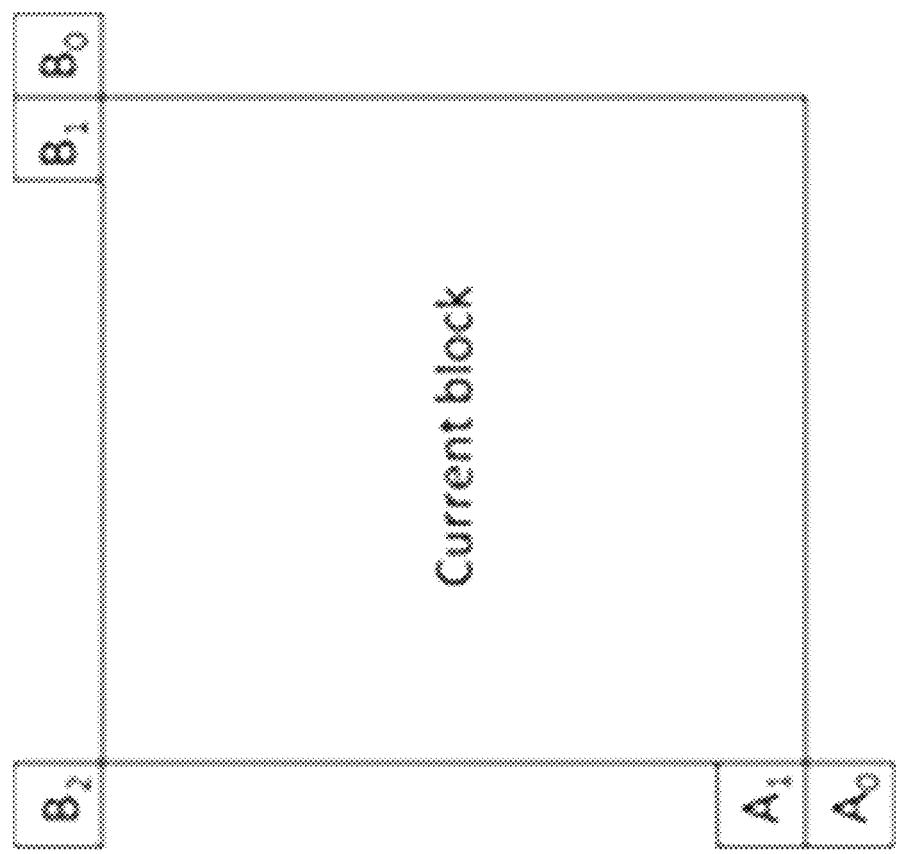

FIGS. 3A and 3B are conceptual diagrams illustrating spatial and temporal neighboring motion vector candidates for merge/skip modes.

In HEVC, the largest coding unit in a slice is called a coding tree block (CTB) or coding tree unit (CTU). A CTB contains a quad-tree the nodes of which are coding units. In HEVC, the size of a CTB can range from 16×16 to 64×64 in the HEVC main profile (although technically 8×8 CTB sizes can be supported). A coding unit (CU) may be the same size of a CTB, or as small as 8×8, in HEVC. Each coding unit may be coded with one mode. When a CU is inter coded, it may be further partitioned into two or four prediction units (PUs), or become just one PU when further partitioning does not apply. When two PUs are present in one CU, they can be half size rectangles or two rectangles having sizes of ¼ and ¾ size of the CU. When the CU is inter coded, one set of motion information may be present for each PU. In addition, each PU may be coded with a unique inter-prediction mode to derive the set of motion information. The term "block" may generally refer to a CU, PU, or any other block-based unit used for a video coding purpose.

In the HEVC standard, there are two inter prediction modes, named merge (skip is considered as a special case of merge) and advanced motion vector prediction (AMVP) modes, respectively, for a prediction unit (PU). In either AMVP or merge mode, a motion vector (MV) candidate list, also referred to as a motion vector predictor candidate list, may be maintained for multiple motion vector predictors.

In HEVC, for the skip mode and merge mode, a merge index may be signaled to indicate which candidate in the merging candidate list is used. No inter prediction indicator, reference index, or motion vector difference (MVD) is transmitted. Two types of merging candidates are considered in merge mode: spatial motion vector predictor (SMVP) and temporal motion vector predictor (TMVP). For SMVP derivation, a maximum of four merge candidates are selected among candidates that are located in positions, as depicted in FIG. 3A. The order of derivation is A1→B1→B0→A0→ (B2). Position B2 is considered only when any PU of position A1, B1, B0, A0 is not available or is intra coded or the total number of candidates, after pruning, from positions A1, B1, B0, A0 is less than four.

In HEVC, for the derivation of TMVP, a scaled motion vector is derived based on co-located PU belonging to one of the reference pictures of current picture within the signaled reference picture list. The reference picture list to be used for derivation of the co-located PU is explicitly signalled in the slice header. The scaled motion vector for temporal merge candidate is obtained with the scaled motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC draft specification. For a B-slice, two motion vectors, one for reference picture list 0 and the other for reference picture list 1, are obtained and combined to make a bi-predictive merge candidate.

The position of a co-located PU is selected between two candidate positions, C and H, as depicted in FIG. 3B. If the PU at position H is not available, or is intra coded, or is outside of the current CTU row, position C is used. Otherwise, position H is used for the derivation of the temporal merge candidate.

Besides SMVPs and TMVPs, there are two additional types of synthetic merge candidates: combined bi-predictive MVP and zero MVP. Combined bi-predictive MVP are generated by utilizing SMVP and TMVP. A combined bi-predictive merge candidate is used for B-Slices only. For example, two candidates in the original merge candidate list, which have mvL0 and refIdxL0 or mvL1 and refIdxL1, are used to create a combined bi-predictive merge candidate.

In the process of candidate selection, duplicated candidates having the same motion parameters as the previous candidate in the processing order are removed from the candidate list. This process is defined as pruning process. Also, candidates inside the same merge estimation region (MER) are not considered, in order to help parallel merge processing. Redundant partition shape is avoided in order to not emulate a virtual 2N×2N partition.

Between each generation step, the derivation process is stopped if the number of candidates reaches to MaxNumMergeCand. In the current common test condition, MaxNumMergeCand is set equal to five. Since the number of candidates is constant, index of best merge candidate is encoded using truncated unary binarization (TU).

For the AMVP mode, an inter prediction indicator is transmitted to denote list 0 prediction, list 1 prediction, or bi-prediction. Next, one or two reference indices are transmitted when there are multiple reference pictures. An index is transmitted for each prediction direction to select one motion candidate from the candidate list. As shown in FIGS. 3A and 3B, the candidate list for the inter mode includes two spatial motion candidates and one temporal motion candidate:

1. Left candidate (the first available from A0, A1)
2. Top candidate (the first available from B0, B1, B2)
3. Temporal candidate (the first available from H and C)

The left spatial motion candidate is searched from the below left to the left (i.e., A0 and A1) and the first available one is selected as the left candidate, while the top spatial motion candidate is searched from the above right to the above left (i.e. B0, B1 and B2) and the first available one is selected as the top candidate. A temporal motion candidate is derived from a block (H or C) located in a reference picture, which is termed temporal collocated picture. The temporal collocated picture is indicated by transmitting one flag in slice header to specify which reference picture list and one reference index in slice header to indicate which reference picture in the reference list is used as the collocated reference picture. After the index is transmitted, one or two corresponding motion vector differences (MVDs) are transmitted.

In HEVC, a fixed candidate list size is used to decouple the candidate list construction and the parsing of the index. Moreover, in order to compensate the coding performance loss caused by the fixed list size, additional candidates are assigned to the empty positions in the candidate list. In this process, the index is coded in truncated unary codes of a maximum length, where the maximum length is transmitted in slice header for the skip mode and merge mode and fixed to 2 for the inter mode. As described above, for the skip mode and merge mode, after the derivation and pruning of the four spatial motion candidates and the one temporal motion candidate, if the number of available candidates is smaller than the fixed candidate list size, additional synthetic candidates are derived and added to fill the empty positions in the merging candidate list. For the AMVP mode, a zero vector motion candidate is added to fill the empty positions in the AMVP candidate list after the derivation and pruning of the two spatial motion candidates and the one temporal motion candidate.

In the JEM reference software, there are several inter coding tools which derive/refine the motion vector (MV) for a current block at the decoder side or that utilize an affine motion model. These new inter-prediction approaches are described below.

Figure 4:
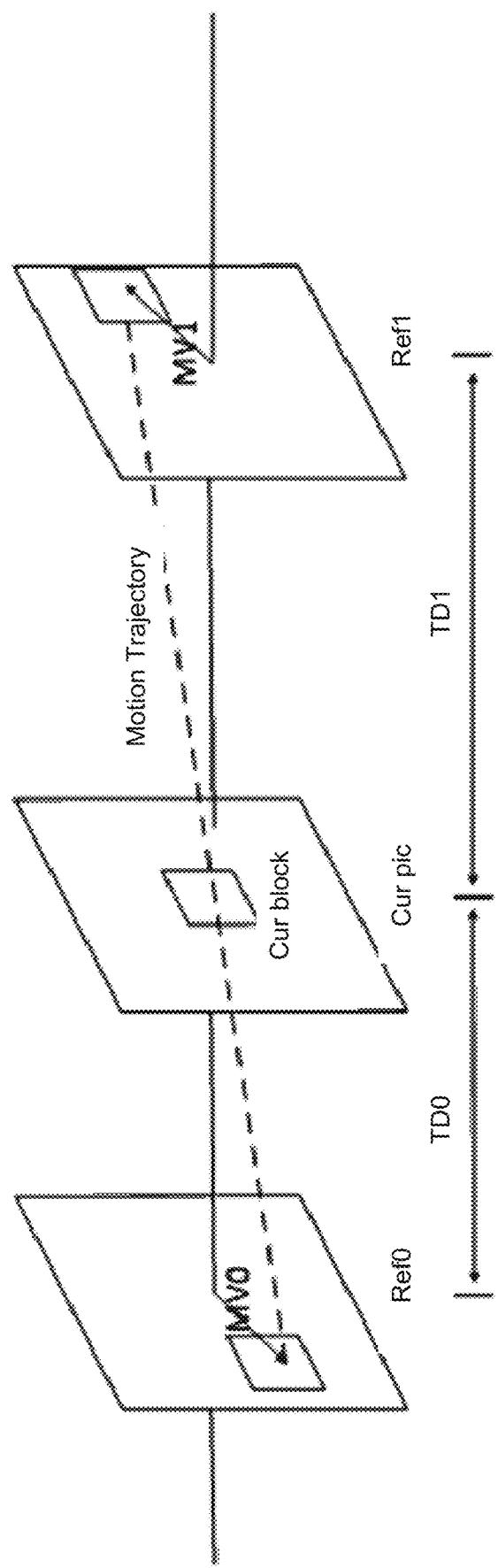
FIG. 4 is a conceptual diagram illustrating an example of bilateral matching for motion derivation of a joint exploration model (JEM).

FIG. 4 is a conceptual diagram illustrating an example of bilateral matching for motion derivation of JEM. Pattern matched motion vector derivation (PMMVD) mode is a special merge mode based on Frame-Rate Up Conversion (FRUC) techniques. With this mode, motion information of a block is not signalled but derived at decoder side (e.g., by video decoder 300). Video encoder 200 may also use these techniques to derive the motion vector, such that a reference block identified by the derived motion vector is the same at both video encoder 200 and video decoder 300.

In JEM, a FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, e.g., video encoder 200, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated (FRUC MV candidates) and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in JEM. Then the MV for each sub-CU is derived.

$$M = \max\left\{4, \min\left\{\frac{M}{2^D}, \frac{N}{2^D}\right\}\right\} \quad (1)$$

As shown in FIG. 4, bilateral matching may be used to derive motion information of the current CU by finding the best match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 5:
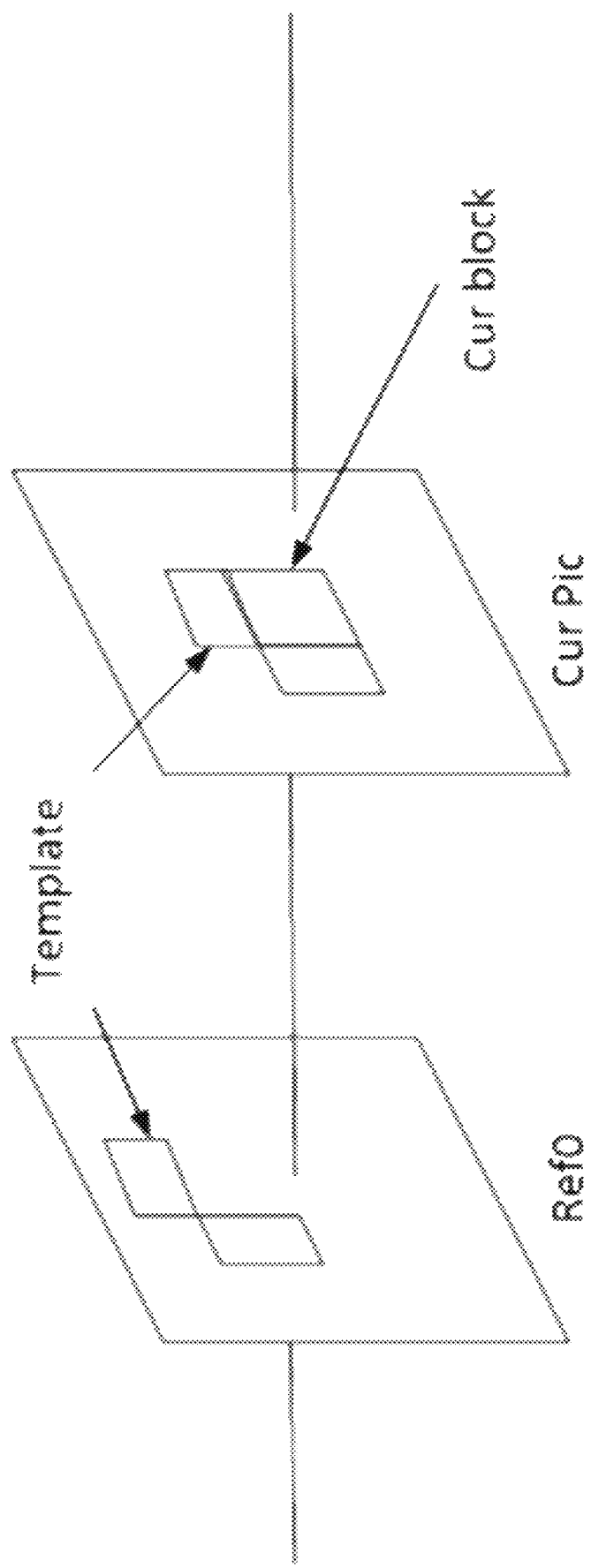
FIG. 5 is a conceptual diagram illustrating an example of template matching for motion derivation of JEM.

FIG. 5 is a conceptual diagram illustrating an example of template matching for motion derivation of JEM. As shown in FIG. 5, template matching may be used to derive motion information of the current CU by finding the best match between a template (top and/or left neighbouring blocks of the current CU) in the current picture and a block (same size to the template) in a reference picture. Except for the aforementioned FRUC merge mode, template matching may also be applied to AMVP mode. In JEM, as is done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

The MV candidate set at CU level may include:
1. Original AMVP candidates, if the current CU is in AMVP mode,
2. All merge candidates,
3. Several MVs in the interpolated MV field, which is introduced below with respect to FIG. 6, and
4. Top and left neighbouring motion vectors.

When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for Merge CUs are added to the candidate list.

The MV candidate set at sub-CU level may include:
1. An MV determined from a CU-level search,
2. Top, left, top-left and top-right neighbouring MVs,
3. Scaled versions of collocated MVs from reference pictures,
4. Up to 4 ATMVP candidates, and
5. Up to 4 STMVP candidates.

The scaled MVs from reference pictures are derived as follows. All the reference pictures in both lists are traversed. The MVs at a collocated position of the sub-CU in a reference picture are scaled to the reference of the starting CU-level MV. ATMVP and STMVP candidates are limited to the four first ones. At the sub-CU level, up to 17 MVs are added to the candidate list, in JEM.

Figure 6:
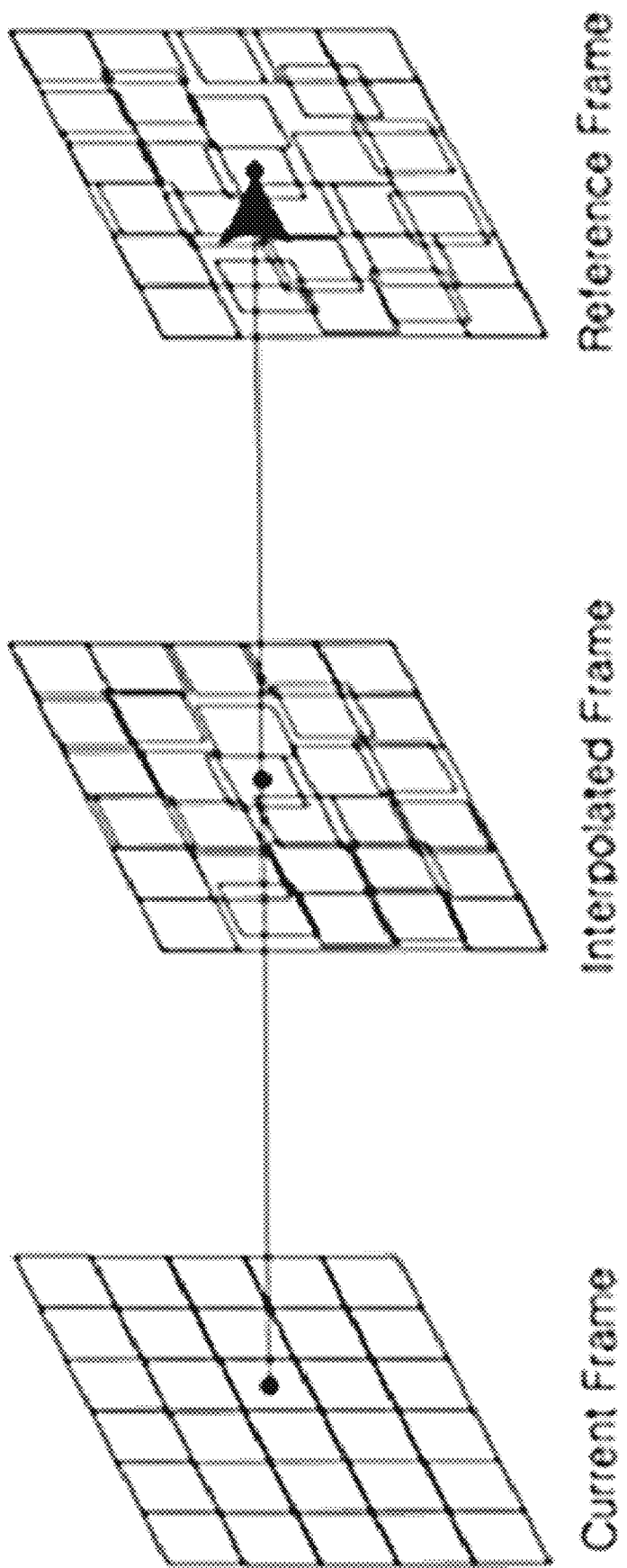
FIG. 6 is a conceptual diagram illustrating an example of unilateral motion estimation in frame rate upconversion (FRUC).

FIG. 6 is a conceptual diagram illustrating an example of unilateral motion estimation in FRUC. In this example, video coders such as video encoder 200 and video decoder 300 may generate an interpolated motion vector field. Before coding a frame, interpolated motion field is generated for a whole picture based on unilateral ME. Then the motion field may be used later as CU level or sub-CU level MV candidates.

First, the motion field of each reference pictures in both reference lists is traversed at 4×4 block level. For each 4×4 block, if the motion associated to the block passing through a 4×4 block in the current picture (as shown in FIG. 6) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

When a motion vector points to a fractional sample position, motion compensated interpolation is needed. To keep low complexity, in JEM, bi-linear interpolation instead of regular 8-tap HEVC interpolation is used for both bilateral matching and template matching.

The calculation of matching cost is a bit different at different steps. When selecting the best candidate from candidate set at CU level, the matching cost is the absolute sum difference (SAD) of bilateral matching or template matching. After the starting MV is determined, the matching cost C is calculated as follows:

$$C = SAD + w \cdot (|MV_x - MV_x^s| + |MV_y - MV_y^s|), \quad (2)$$

where w is a weighting factor which is empirically set to 4, MV and $MV^s$ indicate the current MV and the starting MV, respectively.

In FRUC mode, MV is derived by using luma samples only. The derived motion will be used for both luma and chroma for MC inter prediction. After a MV is decided, final MC is performed using an 8-tap interpolation filter for luma and 4-tap interpolation filter for chroma.

MV refinement is a pattern based MV search with the criterion of bilateral matching cost or template matching cost. In JEM, two search patterns are supported, i.e., unrestricted center-biased diamond search (UCBDS) and adaptive cross search for MV refinement at CU level and sub-CU level, respectively. For both CU and sub-CU level MV refinement, the MV is directly searched at quarter luma sample MV accuracy, and then followed by one-eighth luma sample MV refinement. The search range of MV refinement for both CU and sub-CU step are set equal to 8 luma samples.

In the bilateral matching merge mode, bi-prediction is always applied since the motion information of a CU is derived based on the best match between two blocks along the motion trajectory of the current CU in two different reference pictures. While there is no such limitation for the template matching merge mode. In the template matching merge mode, a CU can choose among uni-prediction from list0, uni-prediction from list1 or bi-prediction. The selection may be based on template matching cost as follows:

```
If (costBi <= factor × min (cost0, cost1))
    bi-prediction is used
Else If (cost0 <= cost1)
    uni-prediction from list0 is used
Else
    uni-prediction from list1 is used
``` where cost0 is the SAD of list0 template matching, cost1 is the SAD of list1 template matching and costBi is the SAD of bi-prediction template matching. The value of factor may be equal to 5/4, which means that the selection process is biased to bi-prediction. The inter prediction direction selection may only be applied to the CU-level template matching process.

Figure 7:
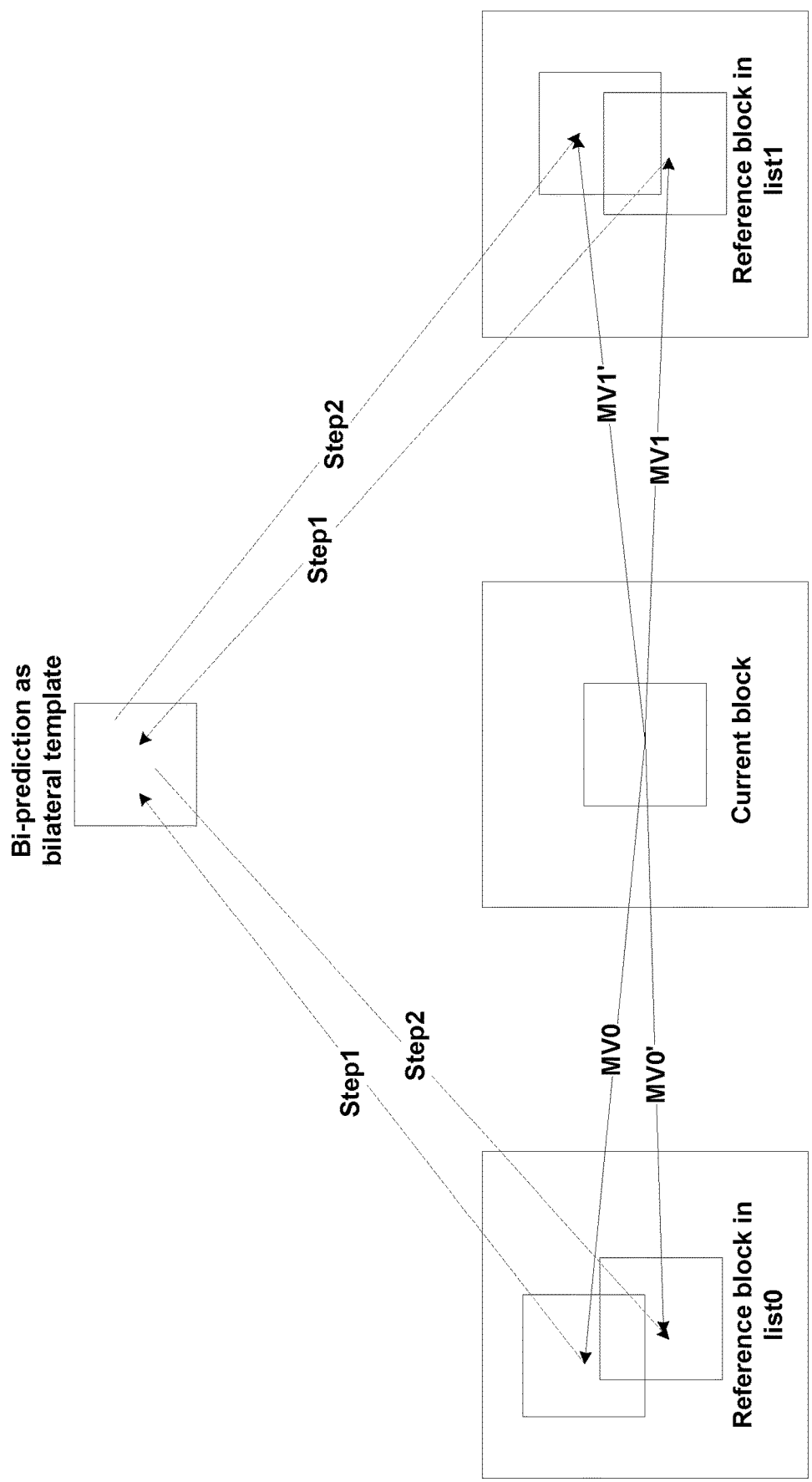
FIG. 7 is a conceptual diagram illustrating an example bilateral template matching process for JEM.

FIG. 7 is a conceptual diagram illustrating an example bilateral template matching process for JEM. In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 7. The template matching operation consists of calculating cost measures between the generated template and the sample region (around the initial prediction block) in the reference picture. For each of the two reference pictures, the MV that yields the minimum template cost is considered as the updated MV of that list to replace the original one. In JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 7, are used for generating the final bi-prediction results. A sum of absolute differences (SAD) is utilized as the cost measure.

DMVR is applied for the merge mode of bi-prediction with one MV from a reference picture in the past and another from a reference picture in the future, without the transmission of additional syntax elements. In JEM, when LIC, affine motion, FRUC, or sub-CU merge candidate is enabled for a CU, DMVR is not applied.

Figure 8:
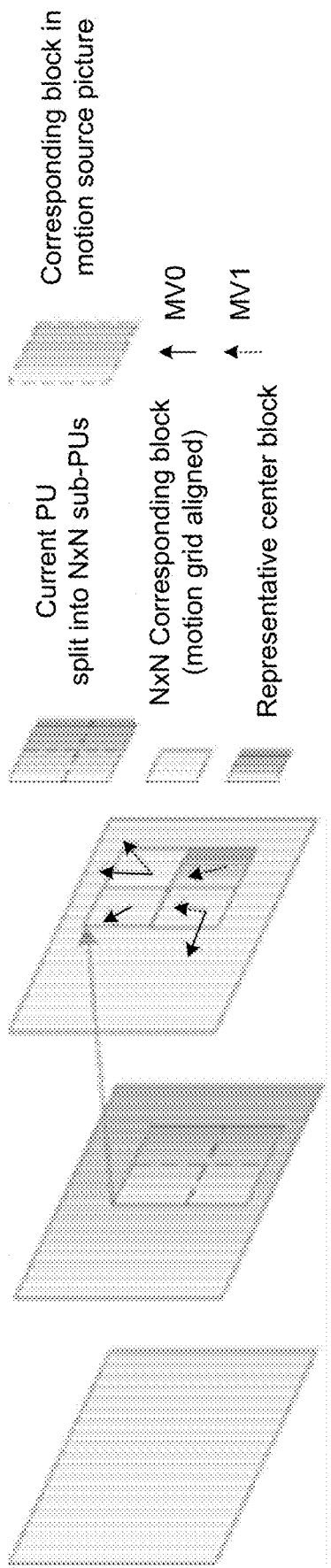
FIG. 8 is a conceptual diagram illustrating an example of advanced temporal motion vector prediction (ATMVP).

FIG. 8 is a conceptual diagram illustrating an example of advanced temporal motion vector prediction (ATMVP). In JEM with QTBT, each CU can have at most one set of motion for each prediction direction. Two sub-CU level motion vector prediction methods are studied by splitting a large CU into sub-CUs and deriving motion information for all the sub-CUs of the large CU. Advanced temporal motion vector prediction (ATMVP) method allows each CU to fetch multiple sets of motion information from multiple blocks smaller than the current CU in the collocated reference picture. In spatial-temporal motion vector prediction (ST-MVP) method motion vectors of the sub-CUs are derived recursively by using the temporal motion vector predictor and spatial neighbouring motion vector. To preserve more accurate motion field for sub-CU motion prediction, the motion compression for the reference frames may be disabled.

In the advanced temporal motion vector prediction (ATMVP) method, the motion vectors temporal motion vector prediction (TMVP) is improved by allowing each CU to fetch multiple sets of motion information (including motion vectors and reference indices) from multiple blocks smaller than the current CU. As shown in FIG. 8, the sub-CUs are square N×N blocks (N is set to 4 by default).

Using ATMVP, a video coder (such as video encoder 200 or video decoder 300) may predict the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 8.

In the first step, a reference picture and the corresponding block is simply determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center pixel) is used to derive the motion information for the sub-CU. After the motion information of a corresponding N×N block is identified, it is converted to the motion vectors and reference indices of the current sub-CU, in the same way as TMVP, wherein motion scaling and other procedures apply. For example, the decoder checks whether the low-delay condition is fulfilled and possibly uses motion vector MVx (the motion vector corresponding to reference picture list X) to predict motion vector MVy (with X being equal to 0 or 1 and Y being equal to 1−X) for each sub-CU. This is done in the same way as for temporal motion vector prediction.

Figure 9:
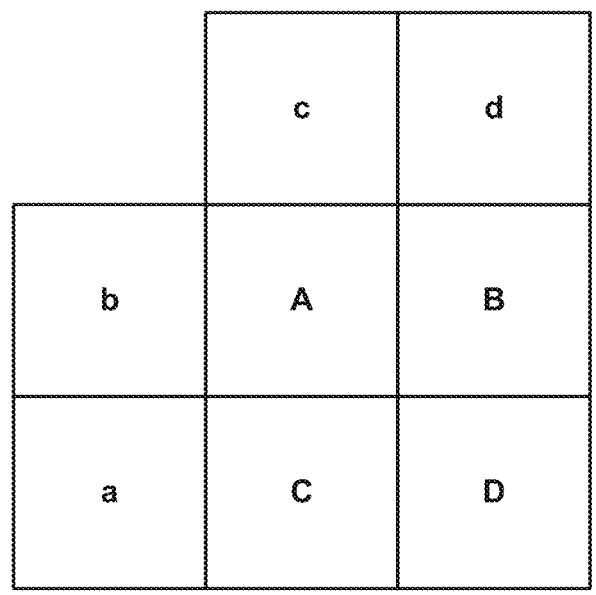
FIG. 9 is a conceptual diagram illustrating four sub-CUs of a parent CU and four neighboring sub-CUs.

FIG. 9 is a conceptual diagram illustrating four sub-CUs of a parent CU and four neighboring sub-CUs. The sub-CUs are labeled A-D (using capital letters), while the neighboring sub-CUs are labeled a-d (using lower case letters). In spatial-temporal motion vector prediction, a video coder (such as video encoder 200 or video decoder 300) may derive motion vectors of sub-CUs recursively, following raster scan order. Consider an 8×8 CU which contains four 4×4 sub-CUs A, B, C, and D. The neighbouring N×N blocks in the current frame are labelled as a, b, c, and d.

The motion derivation for sub-CU A starts by identifying its two spatial neighbours. The first neighbour is N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. At last, after retrieving and scaling the motion information, all available motion vectors (up to 3) are averaged separately for each reference list. The averaged motion vector is assigned as the motion vector of the current sub-CU.

Various motion prediction modes may be used for sub-CUs, and thus, may also be signaled. The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. At encoding logic of the additional merge candidates is same as the merge candidates in HM, which means, for each CU in P or B slice, two more RD checks is needed for the two additional merge candidates. To improve the merge index coding, in JEM, all bins of Merge index is context coded by CABAC, whereas in HEVC, only the first bin is context coded and the remaining bins are context by-pass coded.

Figure 10:
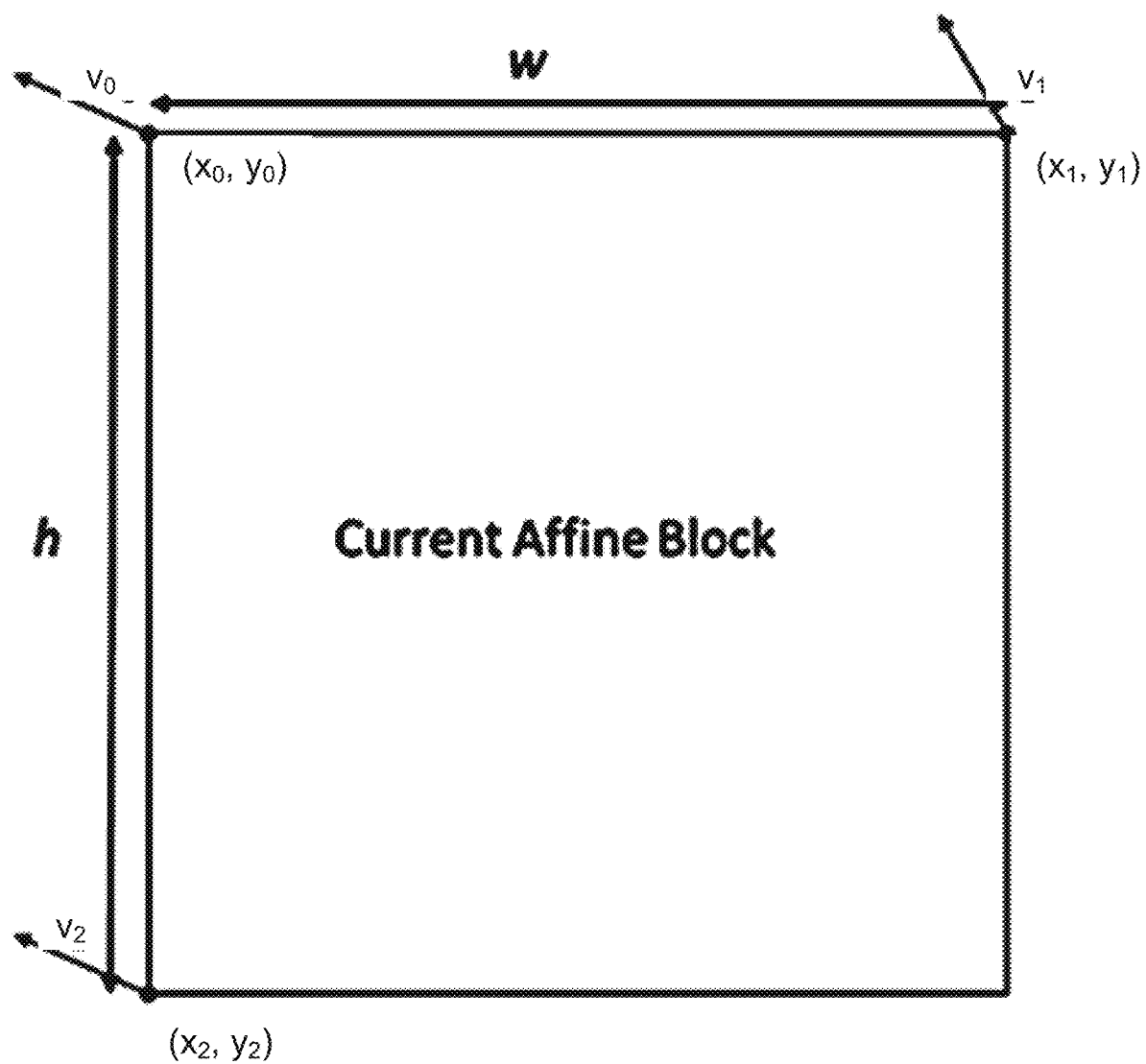
FIG. 10 is a conceptual diagram illustrating an example simplified affine motion model for affine motion prediction.

FIG. 10 is a conceptual diagram illustrating an example simplified affine motion model for affine motion prediction. In HEVC, only translation motion model is applied for motion compensation prediction (MCP). While in the real world, there're many kinds of motions, e.g. zoom in/out, rotation, perspective motions and the other irregular motions. In JEM, an affine transform motion compensation prediction is applied to improve the coding efficiency. If a block follows the affine motion model, the MV of position (x, y) in the block can be determined by the affine motion model:

$$\begin{cases} v_x = ax + by + c \\ v_y = dx + ey + f \end{cases}, \quad (3)$$

where a, b, c, d, e and f are affine parameters.

As shown in FIG. 10, the 6-parameters affine motion model can be represented by the motion vector $v_0$ of the top-left control point $(x_0, y_0)$, the motion vector $v_1$ of the top-right control point $(x_1, y_1)$ and the motion vector $v_2$ of the top-right control point $(x_2, y_2)$. With the assumption that the top-left control point is the origin of the coordinate system, which means $(x_0, y_0)=(0, 0)$, the MV of position (x, y) in the block is described by the following equation:

$$\begin{cases} v_x = \dfrac{(v_{1x} - v_{0x})}{w}x + \dfrac{(v_{2x} - v_{0x})}{h}y + v_{0x} \\ y_y = \dfrac{(v_{1y} - v_{0y})}{w}x + \dfrac{(v_{2y} - v_{0y})}{h}y + v_{0y} \end{cases} \quad (4)$$

where $(v_{0x}, v_{0y})$ is motion vector of the top-left corner control point, $(v_{1x}, v_{1y})$ is motion vector of the top-right corner control point, $(v_{2x}, v_{2y})$ is motion vector of the bottom-left corner control point, $w=(x_1-x_0)$ is the horizontal distance between the top-left and top-right control points, and $h\times(y_2-y_0)$ is the vertical distance between the top-left and bottom-left control points.

Figure 11:
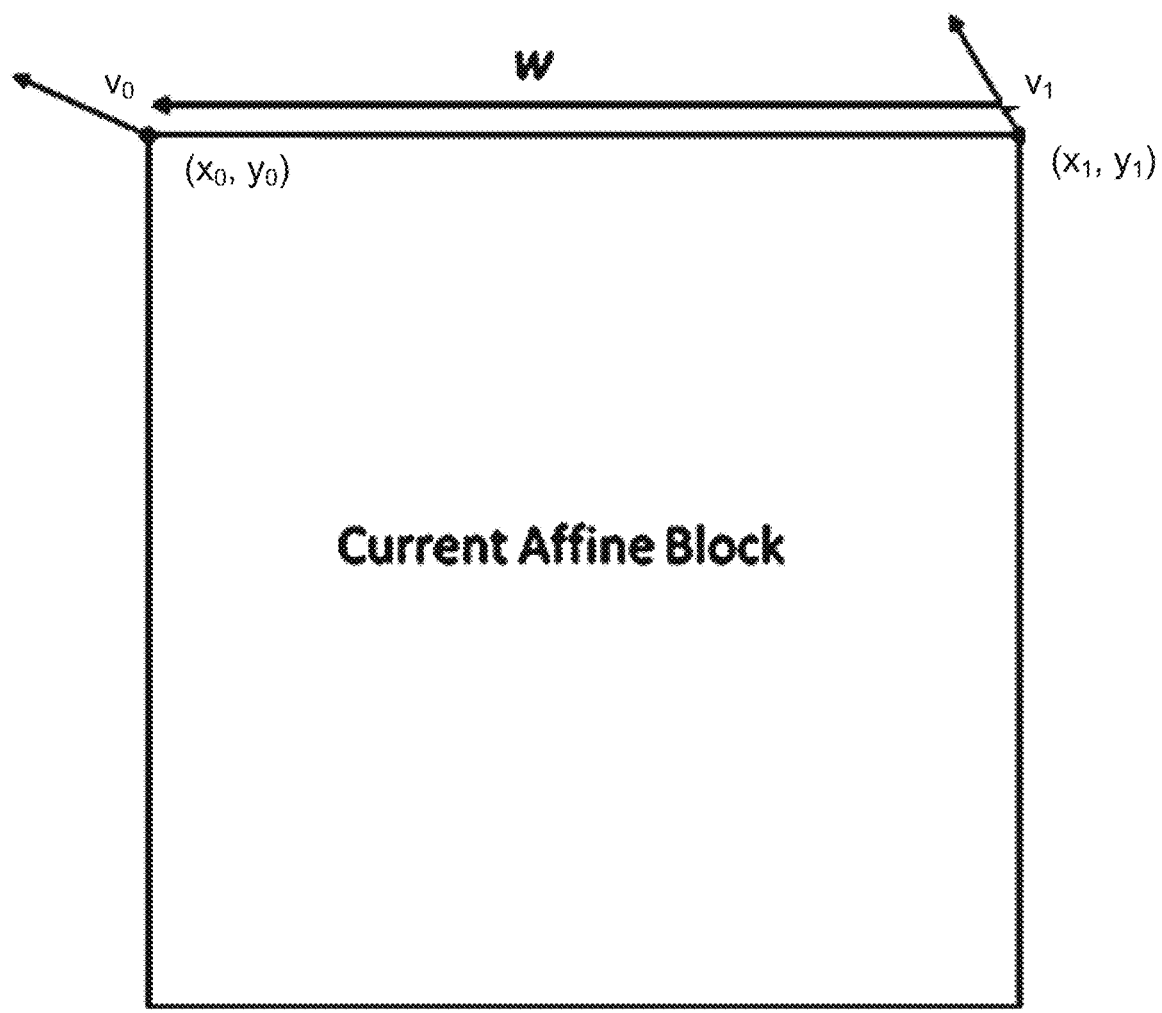
FIG. 11 is a conceptual diagram illustrating another example of a simplified affine motion model.

FIG. 11 is a conceptual diagram illustrating another example of a simplified affine motion model. In JEM, the affine motion model is simplified to a 4-parameter affine motion model by assuming a=e and b=−d in equation (3):

$$\begin{cases} v_x = ax - by + c \\ v_y = bx + ay + f \end{cases} \quad (5)$$

The 4-parameters affine motion model is then represented by the motion vector $v_0$ of the top-left control point $(x_0, y_0)$ which is assumed as the origin point and the motion vector $v_1$ of the top-right control point $(x_1, y_1)$. As shown in FIG. 11, the affine motion field of the block is described by two control point motion vectors. The motion vector field (MVF) of a block is described by the following equation:

$$\begin{cases} v_x = \dfrac{(v_{1x} - v_{0x})}{w}x - \dfrac{(v_{1y} - v_{0y})}{w}y + v_{0x} \\ y_y = \dfrac{(v_{1y} - v_{0y})}{w}x + \dfrac{(v_{1x} - v_{0x})}{w}y + v_{0y} \end{cases} \quad (6)$$

where $(v_{0x}, v_{0y})$ is motion vector of the top-left corner control point, and $(v_{1x}, v_{1y})$ is motion vector of the top-right corner control point and $w=(x_1-x_0)$ is the horizontal distance between the top-left and top-right control points.

Figure 12:
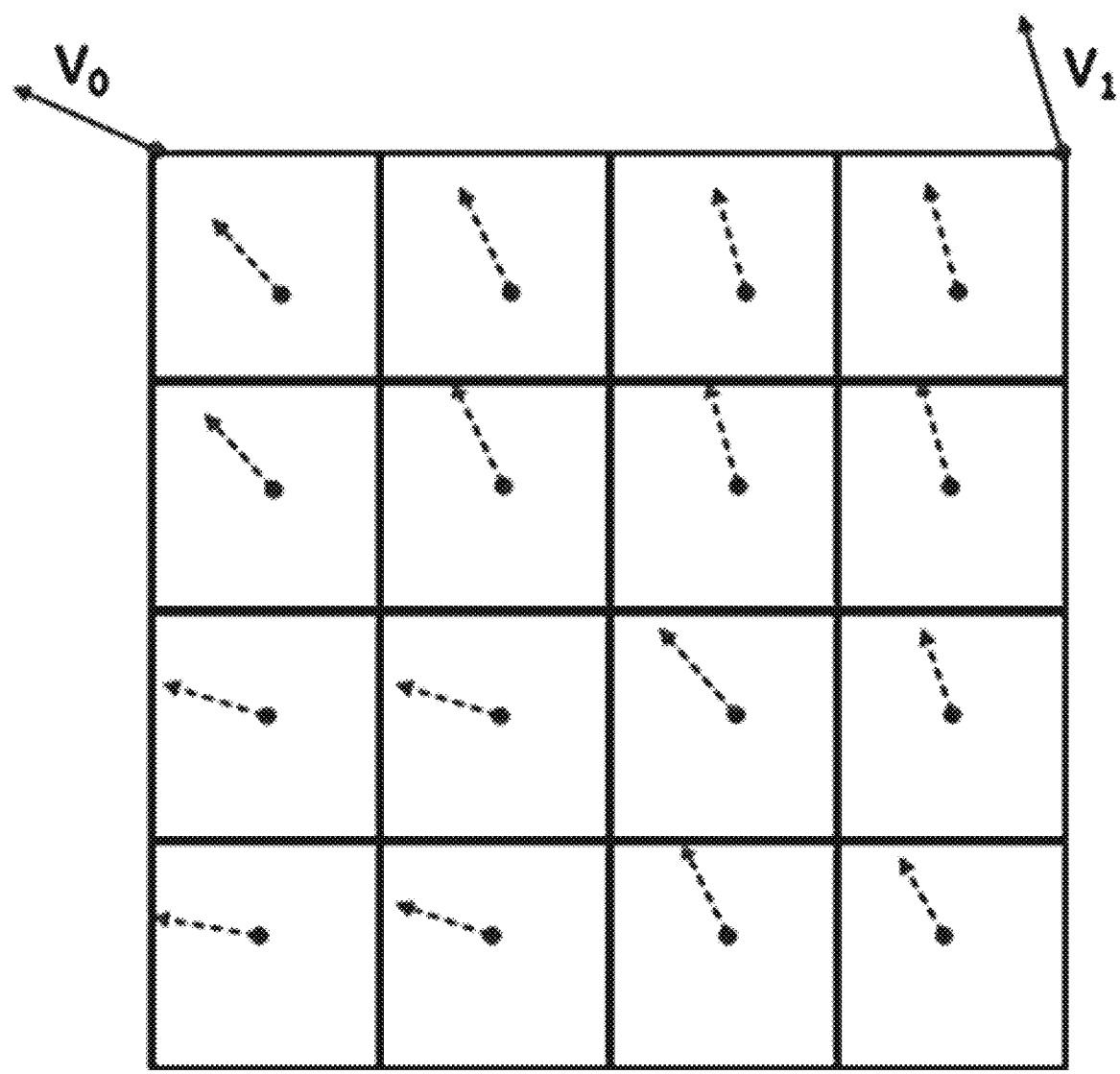
FIG. 12 is a conceptual diagram illustrating an example motion compensation prediction (MCP) motion vector field.

FIG. 12 is a conceptual diagram illustrating an example motion compensation prediction (MCP) motion vector field. In this example, the motion vector of each sub-block (e.g., each 4×4 block) is interpolated by the motion vectors of the control points. The motion vectors may then be used to perform motion compensation prediction for each sub-block.

In order to further simplify the motion compensation prediction, block based affine transform prediction may be applied. To derive the motion vectors of each sub-block, the motion vector of the center sample of each sub-block, as shown in FIG. 12, is calculated according to equation (6), and rounded to 1/16 fraction accuracy. Then the motion compensation interpolation filters are applied to generate the prediction of each sub-block with derived motion vector. The interpolated motion vectors for each sub-block within the affine block is named as MCP motion vector field (MVF) in the following context. Note that the sub-block size can vary, depending on the MV difference between control points.

Figure 13:
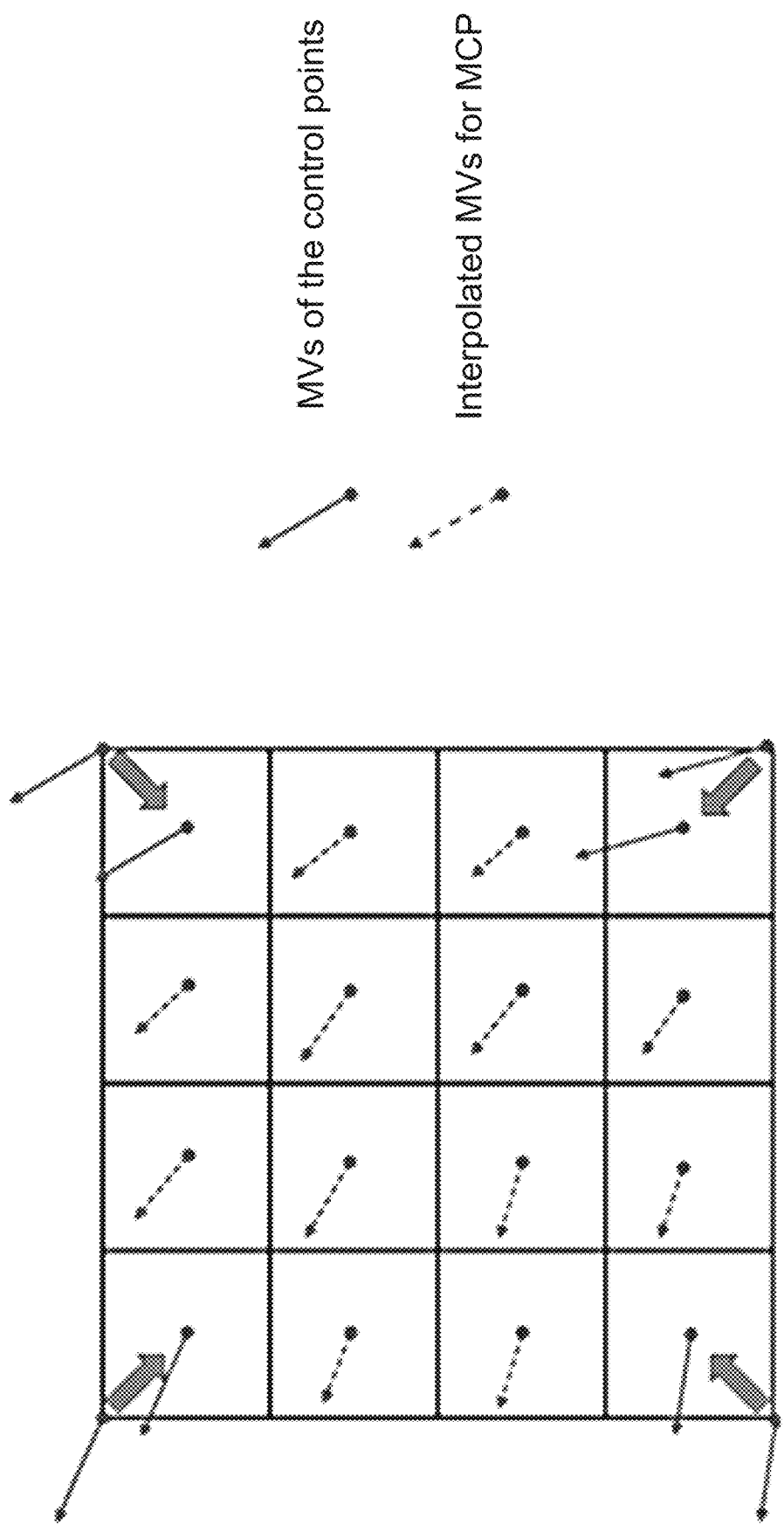
FIG. 13 is a conceptual diagram illustrating an example stored motion vector field.

FIG. 13 is a conceptual diagram illustrating an example stored motion vector field. In this example, the motion vector of each sub-block (e.g., each 4×4 block) is interpolated by the motion vectors of the control points. The stored motion vectors of the four corner sub-blocks may be the motion vectors of the nearby control points.

After MCP, the high accuracy motion vector of each sub-block is rounded and saved as the same accuracy as the normal motion vector. In JEM and HEVC, the motion vectors for each inter prediction CU or PU are stored for the MV prediction of the other inter blocks. The store unit for motion vectors is a 4×4 block. In JEM, the interpolated MVs of an affine block are generated and store for each 4×4 block. However, since the MVs of the control points may be used for the following blocks, the stored MVs for the corner 4×4 blocks are the MVs of the control points instead of the associated MVs used for MCP as shown in FIG. 13. Note that in JEM, the MVs of the bottom-left and bottom-right control points are also generated by the MVs of the top-left and top-right control points.

Figure 14:
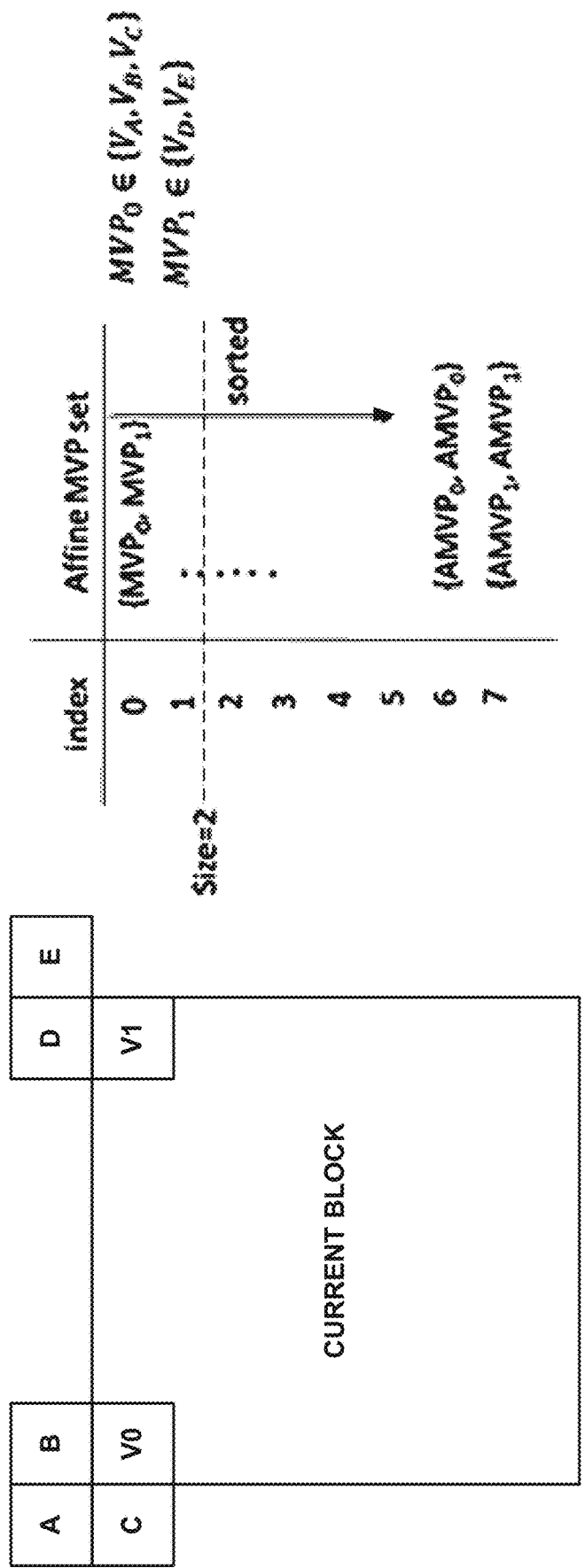
FIG. 14 is a conceptual diagram illustrating an example of motion vector prediction for affine inter mode of JEM.

FIG. 14 is a conceptual diagram illustrating an example of motion vector prediction for affine inter mode of JEM. In JEM, there are two affine motion modes: affine inter (AF_INTER) mode and affine merge (AF_MERGE) mode. For CUs with both width and height larger than 8, AF_INTER mode can be applied. An affine flag in CU level is signalled in the bitstream to indicate whether AF_INTER mode is used. In this mode, a candidate list with motion vector set $\{(MVP_0, MVP_1)|MVP_0=\{v_A, v_B, v_C\}, MVP_1=\{v_D, v_E\}\}$ is constructed using the neighbour blocks. As shown in FIG. 14, $MVP_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $MVP_1$ from the neighbour block D and E is similar.

If the number of candidate list is smaller than 2, the list is padded by the motion vector pair composed by duplicating each of the AMVP candidates $\{AMVP_0, AMVP_0\}$ and $\{AMVP_1, AMVP_1\}$. When the candidate list is larger than 2, the candidates are firstly sorted according to the consistency of the neighbouring motion vectors (similarity of the two motion vectors in a pair candidate) and only the first two candidates are kept as shown in the right part of FIG. 14. RD cost check is used to determine which motion vector set candidate is selected as the control point motion vector prediction (CPMVP) of the current CU. And an index indicating the position of the CPMVP in the candidate list is signalled in the bit stream. After the CPMVP of the current affine CU is determined, affine motion estimation is applied and the control point motion vector (CPMV) is found. Then the difference of the CPMV and the CPMVP is signalled in the bit stream.

FIGS. 15A and 15B are conceptual diagrams illustrating example candidates for affine merge mode of JEM. When a CU is applied in affine merge (AF_MERGE) mode, it gets the first block coded with affine mode from the valid neighbour reconstructed blocks based on the visiting order: A1→B1→B0→A0→B2. And the selection order for the candidate block is from left, above, above right, left bottom to above left as shown in FIG. 15A. If the neighbour left bottom block A is coded in affine mode as shown in FIG. 15B, the motion vectors $v_2$, $v_3$ and $v_4$ of the top left corner, above right corner and left bottom corner of the CU which contains the block A are derived. And the motion vector $v_0$ of the top left corner on the current CU is extrapolated according to $v_2$, $v_3$ and $v_4$ using equation (7) by assuming $(x_2, y_2)$ is the origin point which means $(x_2, y_2)=(0, 0)$.

Secondly, the motion vector $v_1$ of the above right of the current CU is calculated in a similar way. Equation (7) is shown as below:

$$\begin{cases} v_x = \frac{(v_{3x} - v_{2x})}{w}x + \frac{(v_{4x} - v_{2x})}{h}y + v_{2x} \\ y_y = \frac{(v_{3y} - v_{2y})}{w}x + \frac{(v_{4y} - v_{2y})}{h}y + v_{2y} \end{cases} \quad (7)$$

where $(v_{2x}, v_{2y})$ is motion vector of the top-left corner control point $(x_2, y_2)$, $(v_{3x}, v_{3y})$ is motion vector of the top-right corner control point $(x_3, y_3)$, $(v_{4x}, v_{4y})$ is motion vector of the bottom-left corner control point $(x_4, y_4)$ in the neighbor affine block, $w=(x_3-x_2)$ is the horizontal distance between the top-left and top-right control points, and $h=(y_4-y_2)$ is the vertical distance between the top-left and bottom-left control points.

After the CPMV of the current CU $v_0$ and $v_1$ are derived, according to the affine motion model of equation (4), the MVF of the current CU is generated. In order to identify whether the current CU is coded with AF_MERGE mode, an affine flag is signalled in the bit stream when there is at least one neighbour block is coded in affine mode.

In HEVC, Motion Vector Differences (MVDs) (between the motion vector and predicted motion vector of a PU) are signalled in unit of quarter luma sample. In the JEM, Advanced Motion Vector Resolution (AMVR) is introduced. In JEM5, MVD can be coded in units of quarter luma samples, integer luma samples or four luma samples. The MVD resolution is controlled at coding unit (CU) level and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

At encoder side, CU level RD checks are used to determine which MVD resolution is used for a CU. That is, the CU level RD check is performed three times, respectively, for each MVD resolution. To accelerate encoder speed, the following encoding schemes are applied in the JEM:
- During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.
- RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

This disclosure describes techniques that may be used to improve motion vector prediction (MVP). The techniques of this disclosure are elaborated upon below. The techniques of this disclosure may be used alone or in any combination. That is, a video coder, such as video encoder 200 or video decoder 300, may be configured to perform any or all of the techniques of this disclosure, alone or in any combination.

In some examples, video encoder 200 and video decoder 300 may be configured to use the motion vectors of blocks which are not immediately adjacent to a current block for motion vector prediction, because the motion vectors of the non-adjacent blocks can further improve prediction efficiency, especially when the correlation between the spatial motion vectors is strong enough for the motion information of the current block similar to that of non-adjacent blocks, thus the motion information from the non-adjacent blocks can be good MVP candidates for the current block. The non-adjacent spatial motion vector predictor (NA-SMVP) may be used to derive the motion vector predictor for the motion information of current block, or the NA-SMVP can be directly re-used by the current block to perform inter-prediction. Video encoder 200 and/or video decoder 300 may adaptively incorporate the NA-SMVP together with the other MV predictors (e.g. regular SMVP, TMVP, synthetic MVPs) for MV prediction.

Figure 16:
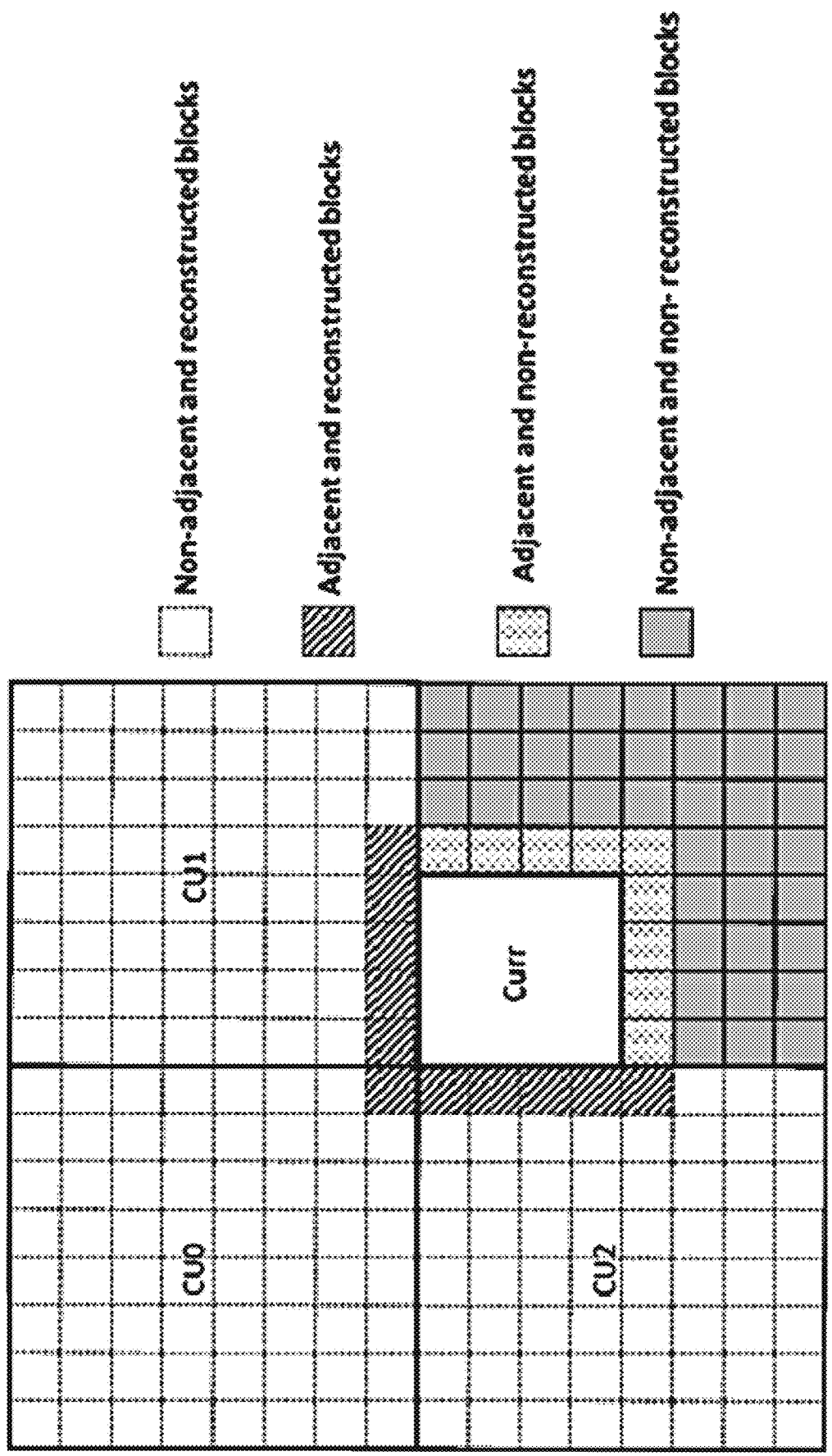
FIG. 16 is a conceptual diagram illustrating examples of non-adjacent blocks to a current block.

FIG. 16 is a conceptual diagram illustrating examples of non-adjacent blocks to a current block. The current block is labeled "Curr." Video encoder 200 and video decoder 300 may derive non-adjacent spatial motion vector predictors (NA-SMVP) from the motion information of the spatially non-adjacent blocks located within the same picture, slice, or a pre-defined region at which the current block is located. Since the motion information of the non-adjacent blocks is used as a motion vector predictor for current block, only the non-adjacent blocks which have motion information reconstructed are considered for non-adjacent MVP derivation. Video encoder 200 and video decoder 300 may be constrained to use the NA-blocks such that the distance between the used NA-blocks and current block is within a range. The distance can be measured in pixel distance in L1 or L2 sense, or the distance can be measured in block distance in L1 or L2 sense. Note that the distance can be measured between the block centers or any designated point within each block. Yet another constraint can be added to the NA-blocks which constrain the NA-blocks to be the blocks which are not adjacent to current blocks and not adjacent to the blocks which are immediately adjacent to current block.

As shown in FIG. 16, the non-adjacent blocks are reconstructed blocks which are not immediately adjacent to the current block. The size of the non-adjacent block can be defined as the smallest unit block used to store the motion information (e.g., 4×4 block) or the basic unit for inter-prediction (e.g., PU in HEVC) or the sub-block as used in affine mode, FRUC mode in JEM or any other specified block size.

Figure 17:
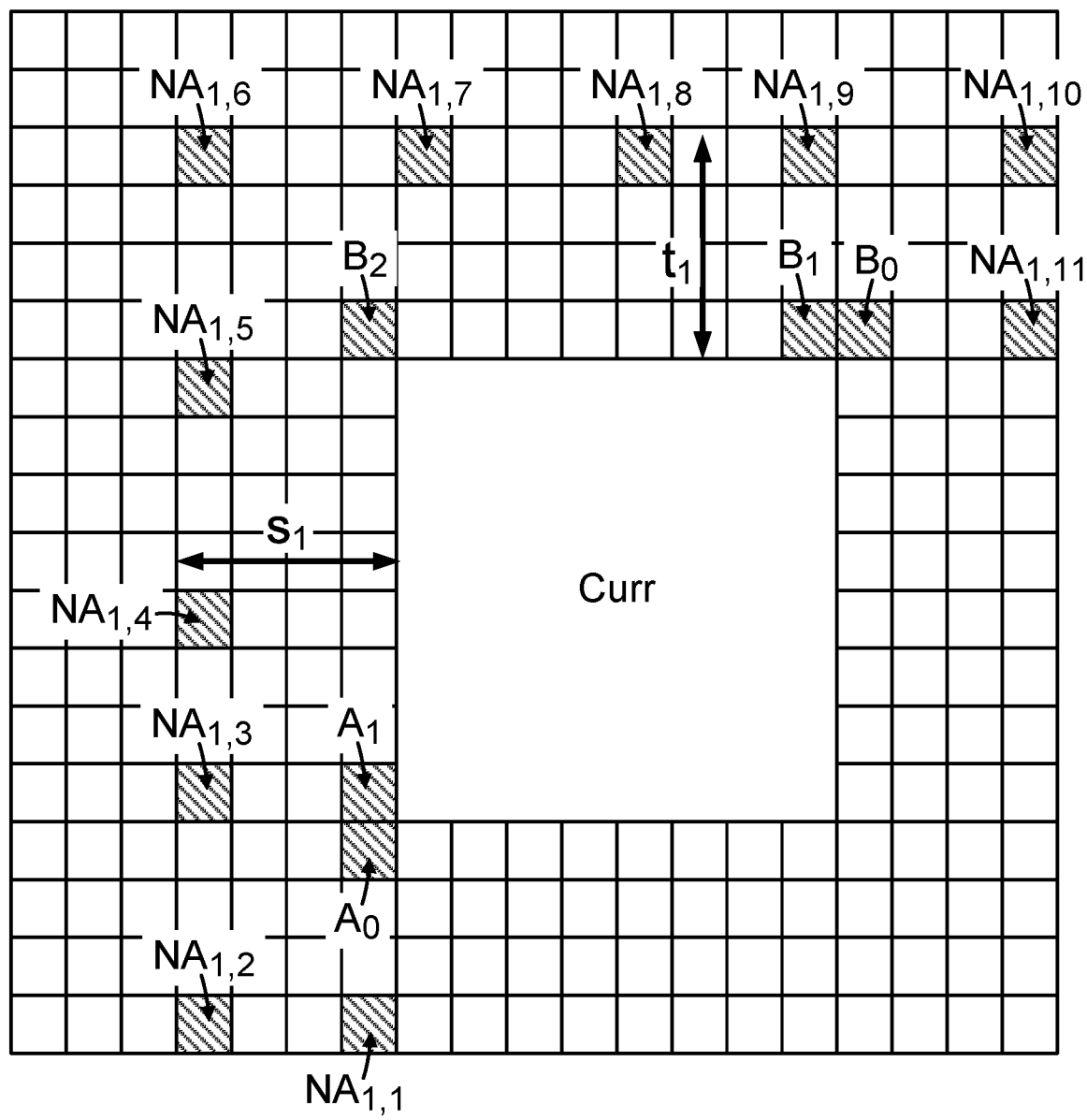
FIG. 17 is a conceptual diagram illustrating an example of selection of non-adjacent blocks.

FIG. 17 is a conceptual diagram illustrating an example of selection of non-adjacent blocks.

Figure 18:
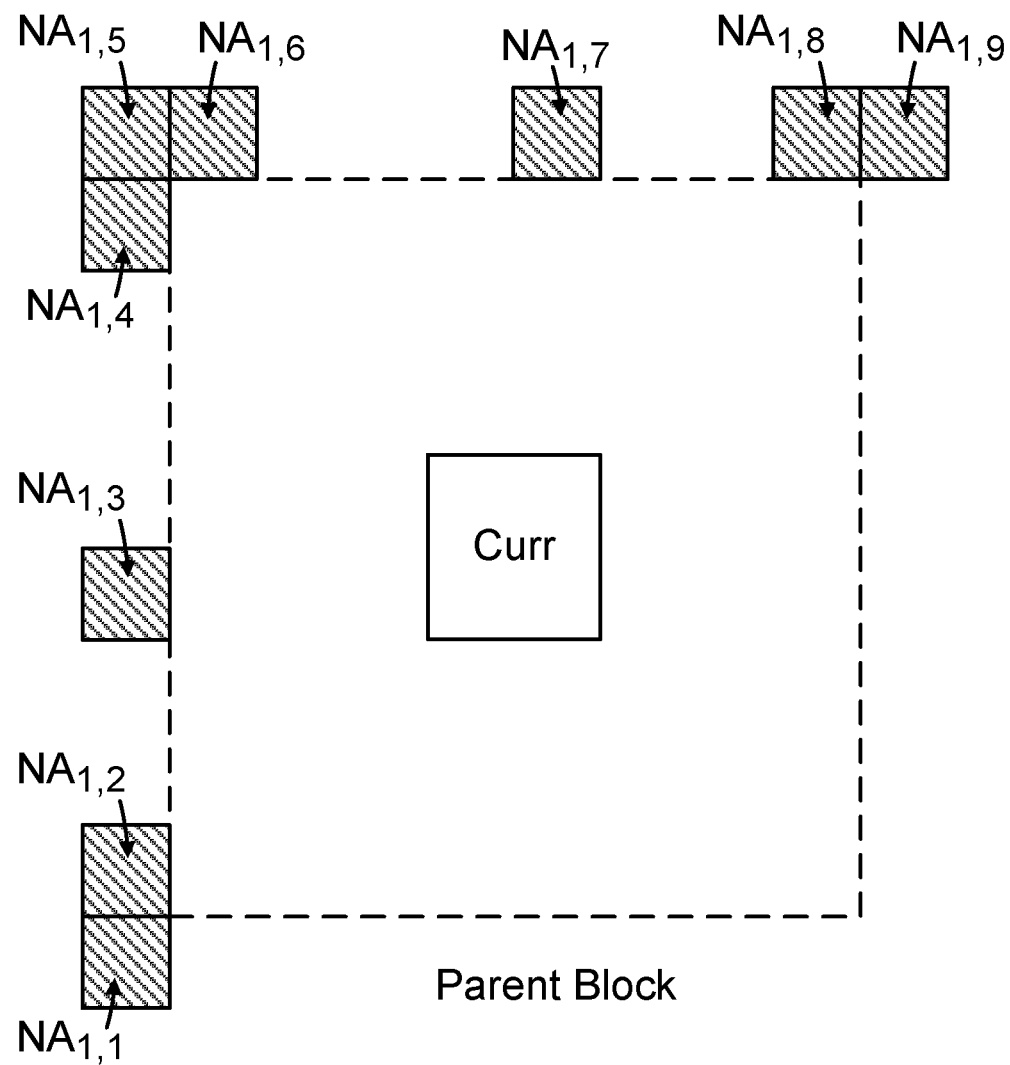
FIG. 18 is a conceptual diagram illustrating an example of selection of non-adjacent blocks based on a parent block.

FIG. 18 is a conceptual diagram illustrating an example of selection of non-adjacent blocks based on a parent block.

Although all non-adjacent blocks can be used for MVP derivation, it may be beneficial (in terms of implementation complexity) to select only a limited number of non-adjacent blocks (NA-blocks) for MVP derivation. Several example techniques to select N (N is a non-negative integer) non-adjacent blocks for motion vector predictor (MVP) derivation are described below.

1. Relative to the position of current block, fixed patterns of non-adjacent blocks are selected for NA-SMVP derivation.
   a. In one example as shown in FIG. 17, besides the adjacent blocks (e.g. A0, A1, B0, B1 and B2) used to derive the regular SMVPs as used in HEVC, a fixed pattern of 11 NA-blocks (NA1,1, NA1,2, NA1,3, NA1,4, NA1,5, NA1,6, NA1,7, NA1,8, NA1,9, NA1,10, NA1,11) which surround the current block are used to derive the NA-SMVPs. The horizontal distance s1 and the vertical distance t1 are two descriptors of this pattern.
   b. In another example as shown in FIG. 18, besides the adjacent blocks used to derive the regular SMVPs as used in HEVC, current block will use the adjacent block of a parent block which contains the current block as the NA-blocks for MVP derivation. In FIG. 18, the adjacent blocks (NA1,1, NA1,2, NA1,3, NA1,4, NA1,5, NA1,6, NA1,7, NA1,8, NA1,9) of parent block are selected as the non-adjacent blocks for the blocks within this parent block. The size of the parent block can be pre-determined or signaled in the bitstreams or dependent on the size of current block or dependent on the coded mode (e.g., Skip/merge/AMVP).
   c. The NA-SMVPs can be derived from, but are not limited to, the disclosed patterns of non-adjacent spatial blocks.
2. Distance between the current block and the non-adjacent block can be defined by L1-norm or L2-norm.
3. N non-adjacent block are selected according to reverse coding order.
4. A global MV candidate list is constructed by inserting all the reconstructed MVs into this list according to a pre-defined order. The global MV candidate list may contain the MVs derived from the adjacent blocks as well as the MVs derived from non-adjacent blocks. The MV predictor of current block may be then derived using this global MV candidates.
5. As directly fetching non-adjacent MV candidates increases the size of line buffer, an alternative way is to store reconstructed MVs in a history buffer, first-in and first-out. To mimic the non-adjacent MV candidates, only those old MVs in the history buffer are taken as non-adjacent MV candidates. The old MVs in the history buffer may be defined as those close to the end of the history buffer. For example, if the size of history buffer is N. A threshold T (such as T=N/4) may be signaled or set so that the T closest MVs to the exit in the history buffer are defined as old MVs.

To reduce buffer size to store non-adjacent motion, constraints can be added to derive non-adjacent spatial motion vector predictors. If the distance between the non-adjacent block and the current block (or the current CTU) is larger than a threshold, the position of the non-adjacent block can be modified (i.e., adjusted). The threshold can be different for horizontal distance and vertical distance. One example of position modification can be rounding the position to a coarse grid, i.e., reducing stored non-adjacent motions. Another example of position modification can be clipping the position to the threshold if the position is larger than the threshold. Multiple position modification methods with different thresholds can be combined.

Figure 19B:
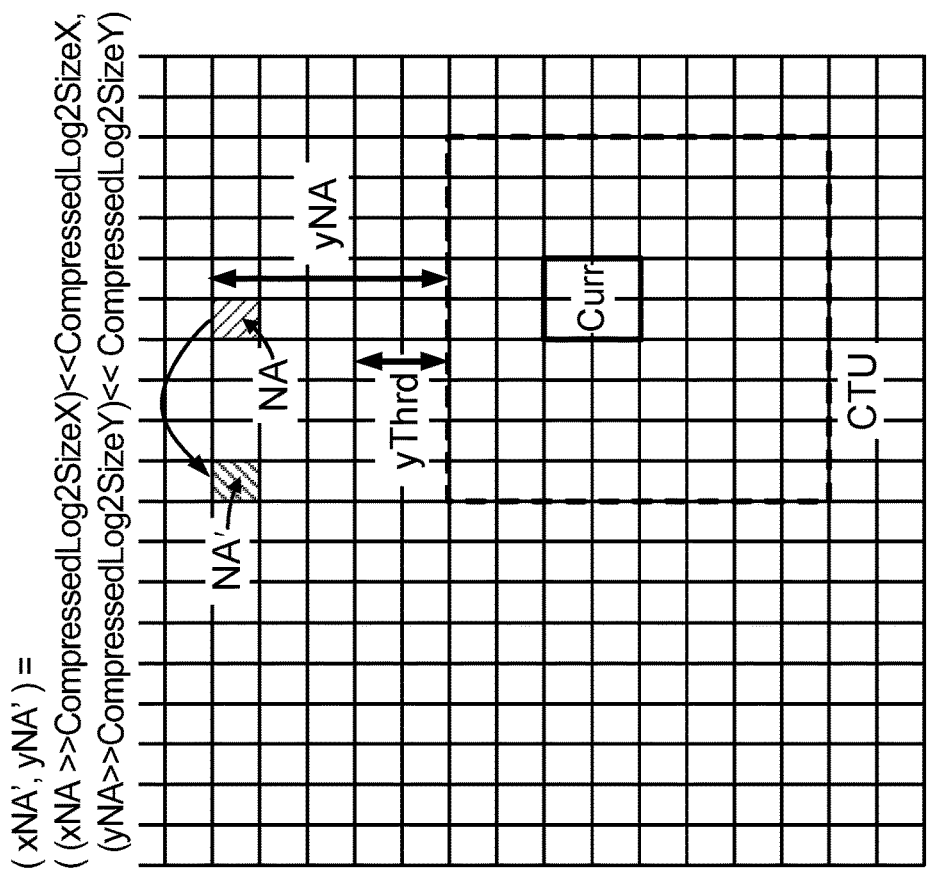
FIGS. 19A and 19B are conceptual diagrams illustrating an example of position modification of a non-adjacent block.
Figure 19A:
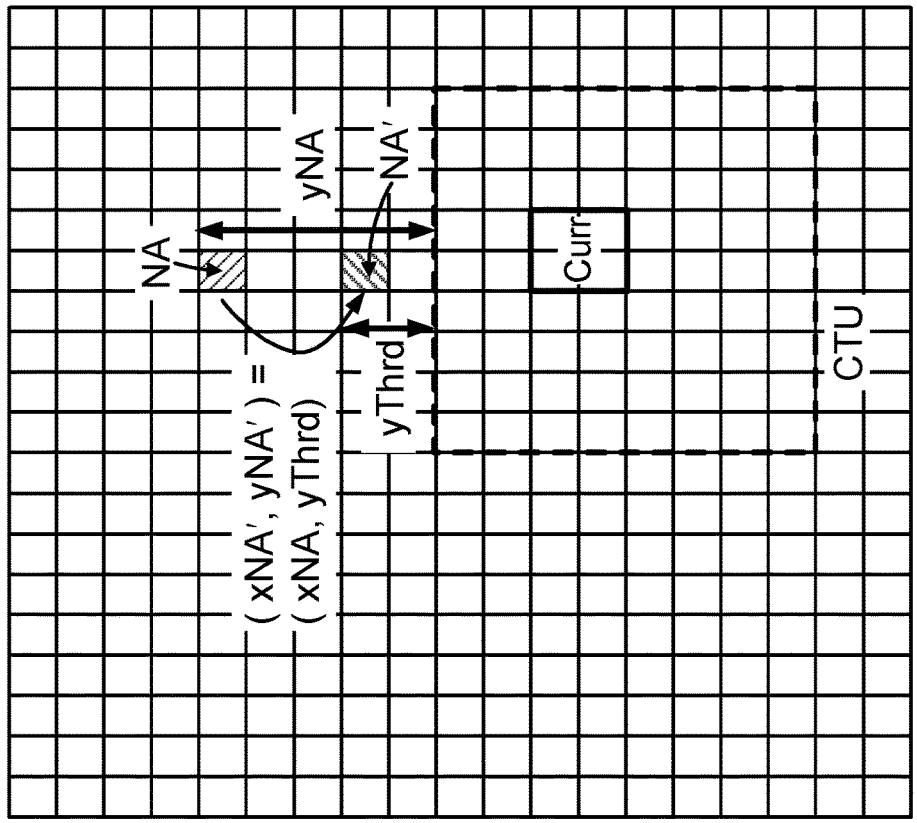
Figure 20B:
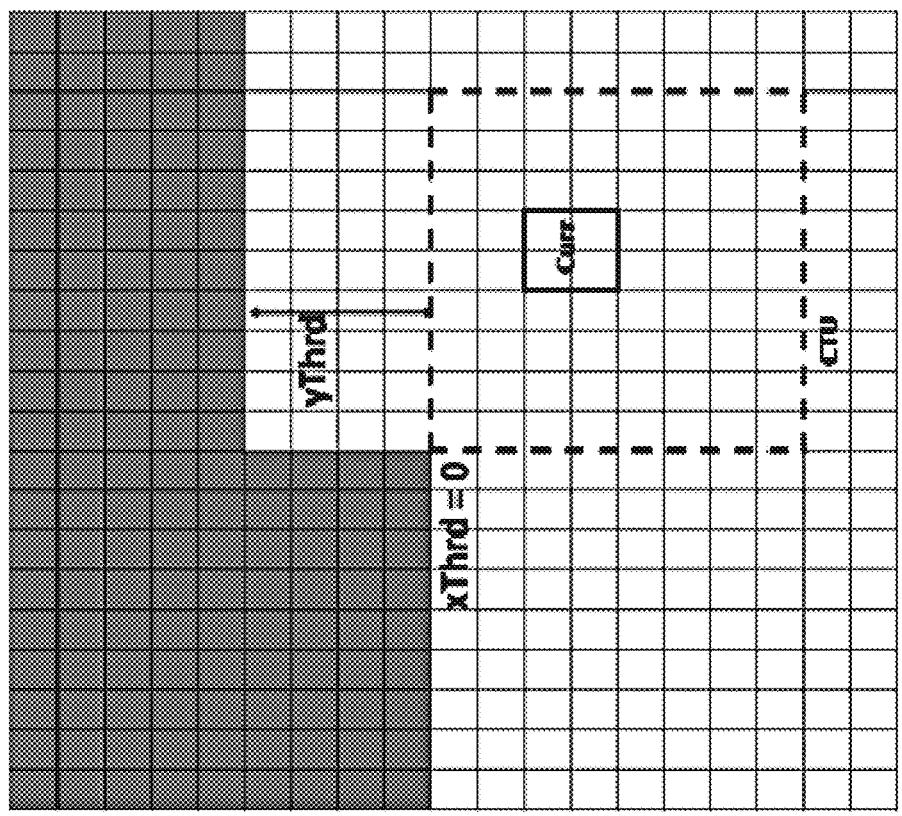
FIGS. 20A and 20B are conceptual diagrams illustrating an example of modifying non-adjacent blocks.
Figure 20A:
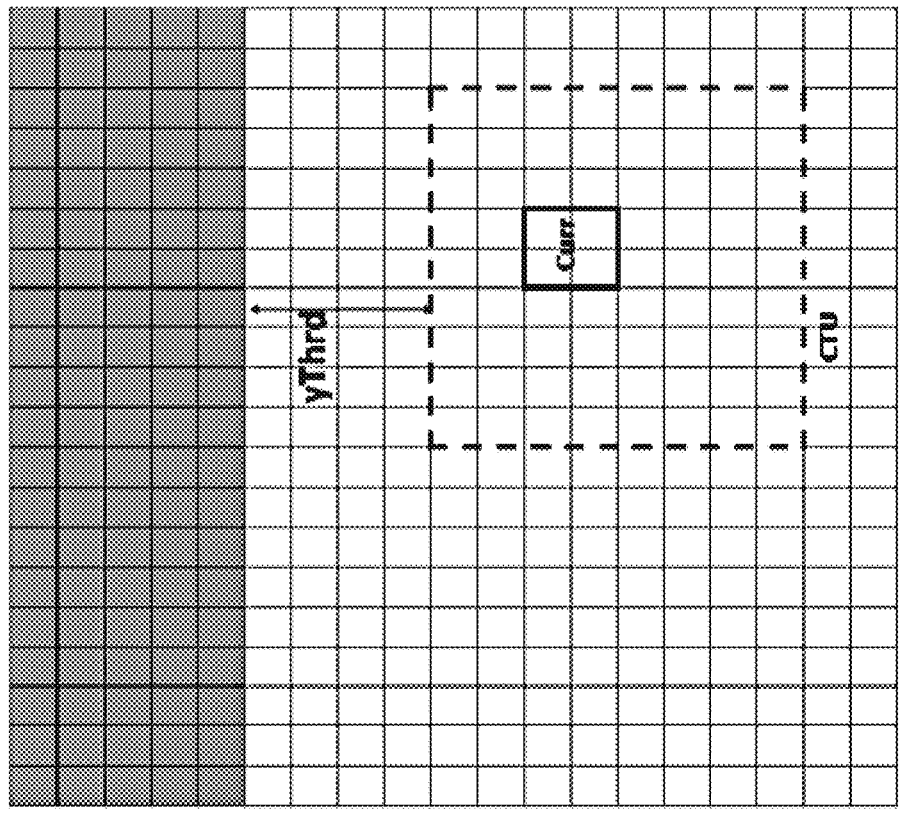

Several examples are listed as follows. Assume the position of a non-adjacent block is (xNA, yNA), the modified position of the non-adjacent block is (xNA', yNA'), the position of top-left grid of the current CTU is (xCTU, yCTU), and the position of the current CU is (xCU, yCU). Examples of constraints can be:

1. If (yCTU−yNA)>(or >=) yThrd, yNA'=yThrd. If (xCTU−xNA)>(or >=) xThrd, xNA'=xThrd. yThrd can be smaller than xThrd. FIG. 19A shows an example with yThrd.
2. If (yCTU−yNA)>(or >=) yThrd and (or) (xCTU−xNA)>(or >=) xThrd, abs(xNA', yNA')= ((xNA>>Compressed Log 2 SizeX) Compressed Log 2SizeX, (yNA>>Compressed Log 2SizeY) Compressed Log 2SizeY). Compressed Log 2SizeX and Compressed Log 2SizeY are values for controlling position rounding. For example, if (xNA, yNA) is (36, 18) and (Compressed Log 2SizeX, Compressed Log 2SizeY) is (4,4), the rounded position, (xNA', yNA'), will be ((36>>4)<<4, (18>>4)<<4)=(32,16). In other word, if a position of a non-adjacent block is far from current block, the position can be rounded to a coarser grid. Thus, the motion buffer can only store non-adjacent block motions on the coarser grid. FIG. 19B shows an example. Note that, xThrd can negative infinity, i.e., (xCTU−xNA) is always larger than xThrd.
3. The threshed of modifying non-adjacent block can be: if (yCTU−yNA)>yThrd, the non-adjacent block should be modified. FIG. 20A shows an example, and red blocks are the non-adjacent block positions that should be modified.
4. The threshed of modifying non-adjacent block can be combination of more than one rules. An example can be that: (1) if (yCTU−yNA)>yThrd, the non-adjacent block should be modified. (2) if (yCTU−yNA)>0 and (xCTU−xNA)>0, the non-adjacent block should be modified. FIG. 20B shows the example of combination of the two rules, and red blocks are the non-adjacent block positions that should be modified.

FIGS. 19A and 19B are conceptual diagrams illustrating an example of position modification of a non-adjacent block.

FIGS. 20A and 20B are conceptual diagrams illustrating an example of modifying non-adjacent blocks.

In one example, only the non-adjacent blocks that locate at the same CTU row as the current block can be selected. In another example, only the non-adjacent blocks that locate at the same CTU as the current block can be selected.

After the N non-adjacent blocks are determined, M (M<=N) non-adjacent spatial motion vector predictors (NA-SMVP) can be derived from the N non-adjacent blocks (NA-blocks). There are different ways to utilize the non-adjacent MVP depending on the inter-prediction mechanism used in the video codec.

When the scheme of Competitive Motion Candidate is used like that in the merge/skip mode in HEVC, JEM, or VVC, the invented non-adjacent MVP is derived and inserted into the candidate list according to a pre-defined order. In one example as shown in FIG. 17 above, the eleven non-adjacent MVP are inserted into the merging candidate list after the conventional spatial MVPs, temporal MVPs and before the synthetic combined candidates, synthetic zero candidates. The full motion pruning process can be applied to the invented NA-SMVP and the other merging candidates; or only the partial motion pruning can be applied to the invented NA-SMVP and the other merging candidates. A full motion pruning process compares one candidate against all the previously derived candidates in the current candidate list to avoid inserting identical candidate in certain extent. To reduce the complexity, a partial motion pruning process compares only limited numbers of candidates instead of comparing each potential one with all the other existing ones.

The NA-SMVPs can be inserted into the candidate list in the disclosed insertion order or in any other conceivable order. Example insertion orders are described below, although other insertion orders are also possible. An example insertion order for merge mode is:
1. Regular SMVPs (e.g. $A_1$, $B_1$, $B_0$, $A_0$, $B_2$)→TMVP (e.g. H or C)→NA-SMVPs→Synthetic Candidates
2. Regular SMVPs (e.g. $A_1$, $B_1$, $B_0$, $A_0$, $B_2$)→Sub-block MV candidates (e.g. ATMVP, STMVP)→TMVP (e.g. H or C)→NA-SMVPs→Synthetic Candidates
3. Regular SMVPs (e.g. $A_1$, $B_1$, $B_0$, $A_0$, $B_2$)→NA-SMVPs→TMVP (e.g. H or C)→Synthetic Candidates An example insertion order for AMVP mode (for List0 or List1 MV prediction) is: Left SMVPs (e.g. $A_0$, $A_1$)→Scaled Left SMVPs (e.g. $A_0$, $A_1$)→Above SMVPs (e.g. $B_0$, $B_1$, $B_2$)→Scaled Above SMVPs (e.g. $B_0$, $B_1$, $B_2$)→NA-SMVPs→Scaled NA-SMVPs→TMVP→Synthetic Candidates.

An example insertion order for affine merge mode is: Regular SMVPs (e.g. $A_1$, $B_1$, $B_0$, $A_0$, $B_2$)→NA-SMVPs.

An example insertion order for affine AMVP mode is: Extrapolated affine MVP→Left SMVPs (e.g. $A_0$, $A_1$)→Scaled Left SMVPs (e.g. $A_0$, $A_1$)→Above SMVPs (e.g. $B_0$, $B_1$, $B_2$)→Scaled Above SMVPs (e.g. $B_0$, $B_1$, $B_2$)→NA-SMVPs→Scaled NA-SMVPs→TMVP→Synthetic Candidates.

When Competitive Spatial-Temporal Motion Candidate is used as the AMVP mode in HEVC, JEM, VVC, or other video codec, the non-adjacent MVP is derived and inserted into the candidate list according to a pre-defined order. In one example, the eleven non-adjacent MVP are inserted into the AMVP candidate list after the conventional spatial MVPs, temporal MVPs and before the synthetic zero candidates. The NA-SMVP derivation can follow the same derivation rule as HEVC or any other rules applied to the SMVP derived from adjacent blocks.

The order of NA-SMVP candidates can be determined either by a certain pre-defined rule or by an adaptive way. For example, NA-SMVP candidates, M candidates from N non-adjacent blocks, are arranged in the same order that N NA-blocks are selected, as described above. Alternatively, the M candidates may be reordered according to frequencies of those candidates and/or distances between a NA-block and the current block, i.e. more frequent candidates and/or candidates from NA-blocks closer to the current block are placed ahead in NA-SMVP candidate list. In addition, all the NA-SMVP candidates are inserted in a fixed position in the candidate list allowed to be re-ordered among only NA-SMVP candidates. But, in another case, all the candidates in the list, including NA-SMVP and other candidates, can be re-ordered according to certain criteria such as the frequency of motion information or any available motion statistics from current and/or previously coded pictures. Please note that the order of the invented NA-SMVPs can be different for certain coding modes, e.g. the merge and/or AMVP mode, and not limited to the disclosed candidate order.

In addition, the pruning process can be made adaptive to the block size. In one example, a threshold value can be used to define what needs to be pruned. For example, if the block size is large then the threshold value should be increased accordingly. Consider two candidates with motion vectors MV0 (added to the list earlier) and MV1, in one example, if the L1 or L2 norm of the distance between MV0 and MV1 is smaller than the pre-defined threshold, the candidate of MV1 will be pruned. The threshold value can be signaled through SPS, PPS, or Slice Header. In another example, the threshold value can be made adaptive based on the current block size. In another example, the threshold value can be made adaptive based on the distance between the candidacy position and the current block. A larger threshold value should be used if the candidate is located farther away from the current block. In another example, classification of motion vectors can be done using methods including but not limited to K-mean or support vector machine, and only the first Mc candidates from each of the Nc classes should be kept in the candidate list, where Mc and the number of classes Nc can be pre-defined or signalled in high-level syntax.

When the scheme of single MVP is used such as the affine merge mode in JEM or VVC, the non-adjacent SMVPs (NA-SMVPs) may also be included in the candidate set along with the other MVPS. The final MVP is then selected as the first available MVP according to a pre-defined order. In one example, when a CU is applied in affine merge (AF_MERGE) mode, it gets the first block coded with affine mode from the valid neighbour reconstructed blocks based on the visiting order:
A1→B1→B0→A0→B2→NA-blocks.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated (FRUC CU level MV candidates set) and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with a FRUC sub-CU level MV candidates set which contains the derived CU motion vectors.

In accordance with the techniques of this disclosure, a video coder, such as video encoder 200 or video decoder 300, may add the NA-SMVP into the FRUC CU level MV candidates set, FRUC sub-CU level MV candidates set, or both.

The high-level syntax related to the non-adjacent MVPs can be pre-determined or explicitly signaled into the bitstreams. The high-level syntax includes but is not limited to the below control parameters:
1. The number of adjacent blocks N. The number can be adaptive according to the coding information such as block size. The number of N may be dependent on the coded mode (e.g., Skip/merge/AMVP) or the maximum allowed number of candidates for the merge/amvp/skip mode.
2. The distance s/t (signal multiple parameters s/t if they exist).
3. The size of the parent block for NA-blocks determination.
4. The enabling/disabling of the non-adjacent MVPs.
5. The number of levels for locating NA-blocks as used in Annex A.

In HEVC, the merging candidate list size ranges from 1 to 5, while the AMVP candidate list size is fixed to 2. In JEM or VVC, the merging candidate list size ranges from 1 to 7, while the AMVP candidate list size is fixed to 2. When inserted into the MVP or merging candidates list, the maximum candidate list size should be increased accordingly. For example, the merging candidate list size is increased to N (N is a positive integer and N>7) when NA-SMVP is inserted into the merging candidate list size; the AMVP candidate list size is increased to M (M is a positive integer and M>2) when NA-SMVP is inserted into the merging candidate list size.

Figure 21:
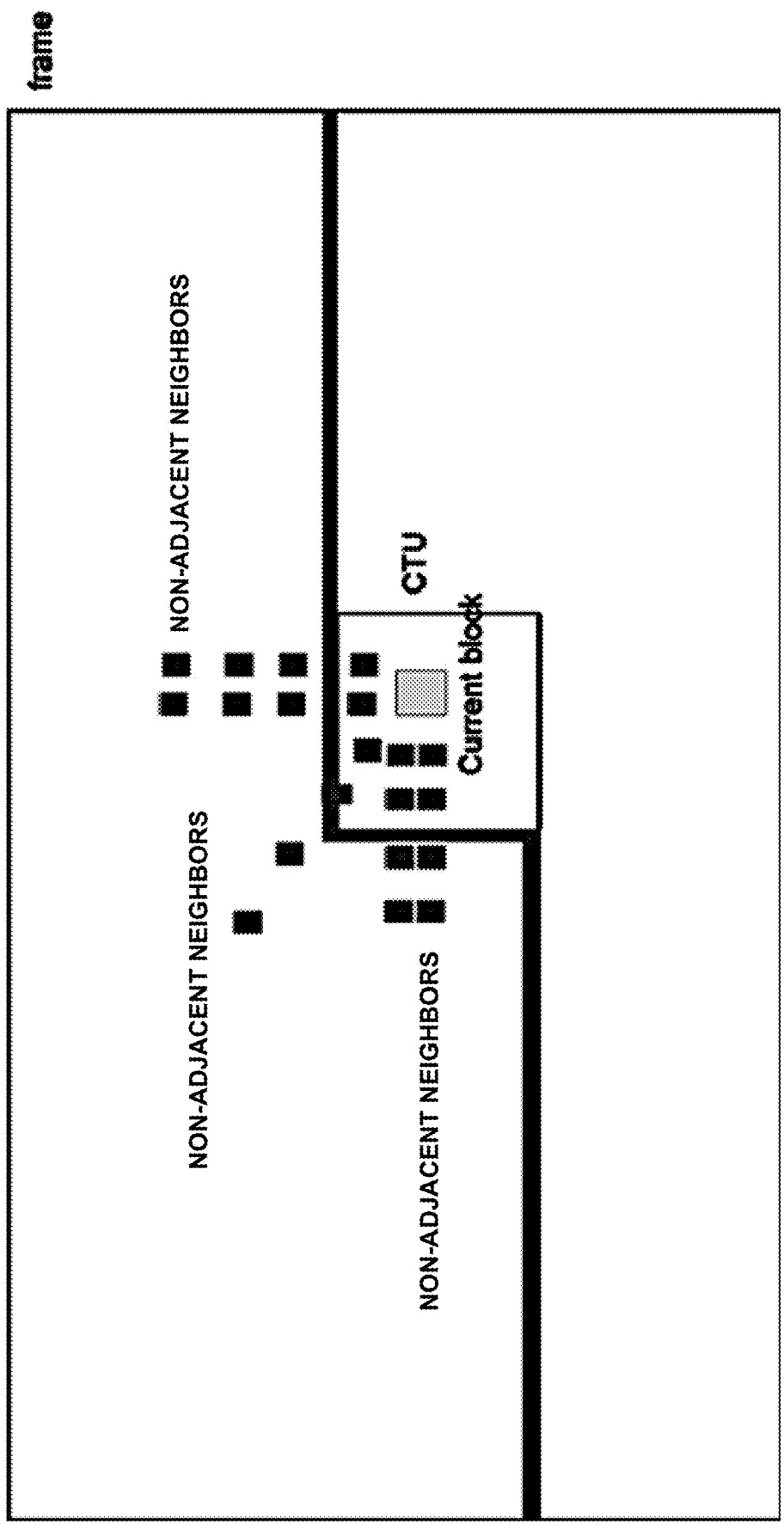
FIG. 21 is a conceptual diagram illustrating an example current block, a coding tree unit (CTU) including the current block, and example non-adjacent neighboring blocks to the current block.

FIG. 21 is a conceptual diagram illustrating an example current block, a coding tree unit (CTU) including the current block, and example non-adjacent neighboring blocks to the current block. With the introduction of non-adjacent spatial candidates, the motion information buffer of the current frame increases. If a decoder, such as video decoder 300, processes one CTU by CTU and only spatial adjacent neighbors are used for merge candidates, the decoder only needs to hold one motion buffer equal to one CTU size and a line buffer including memory to hold just enough motion information that contains motion information of data in frame width+CTU height+1, as shown in FIG. 21. The line buffer is marked as the grey strip and grey blocks represent the non-adjacent neighbors.

For example, if CTU is 128×128, frame width is 1080, and the minimum block that holds motion information is 4×4, the line buffer size will be (128+1080)/4+1.

If non-adjacent spatial candidates are used, the line buffer might increase to (128+1080+1)/4*N/4, where N is the maximum pixel offset of non-adjacent spatial candidate can be away from the current block. Here we assume horizontal and vertical use the same offset.

In accordance with the techniques of this disclosure, video encoder 200 and video decoder 300 may be configured to avoid considering neighboring blocks outside of a CTU including a current block and outside of a line buffer for motion vector prediction for the current block. That is, if a potential non-adjacent neighboring block is outside of the current CTU (or defined memory area) and/or line buffer, video encoder 200 and video decoder 300 may treat the non-adjacent block as an invalid non-adjacent neighboring block for use during motion vector prediction.

Figure 22:
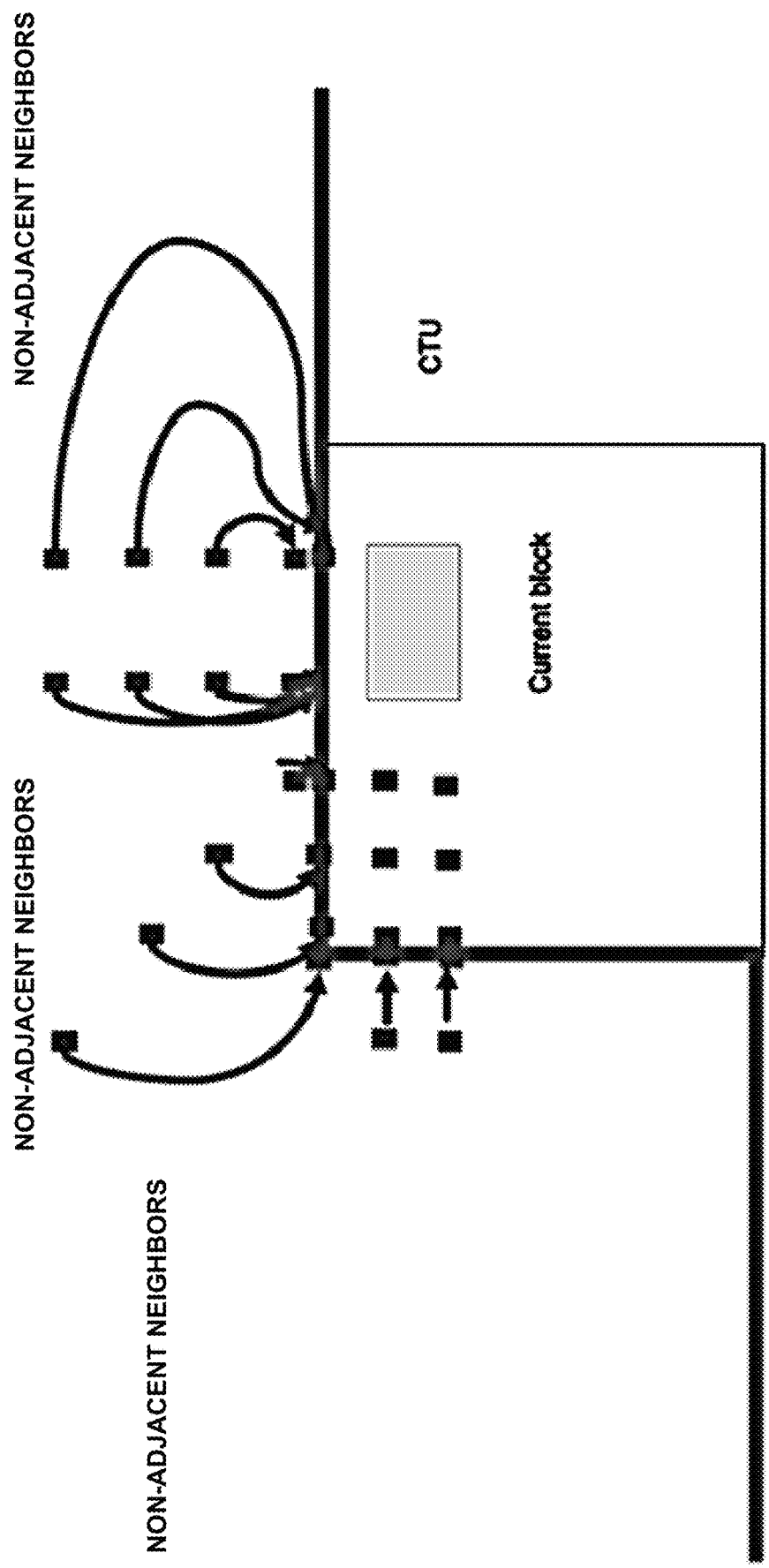
FIG. 22 is a conceptual diagram illustrating an example technique for remapping non-adjacent neighboring blocks according to the techniques of this disclosure.

FIG. 22 is a conceptual diagram illustrating an example technique for remapping non-adjacent neighboring blocks according to the techniques of this disclosure. In some examples, video encoder 200 and video decoder 300 may be configured to remap invalid non-adjacent neighboring blocks to valid non-adjacent neighboring blocks. That is, video encoder 200 and video decoder 300 may map any or all non-adjacent neighboring blocks that are outside of the current CTU (or defined memory area) to neighboring blocks within the CTU (or defined memory area) and/or line buffer.

FIG. 22 shows one example mapping method. If the coordinate of the neighboring block is more than one line (4×4 blocks) above or left of the CTU, video encoder 200 or video decoder 300 may set the coordinate equal to one line above or left of the CTU. Therefore, all non-adjacent neighboring blocks outside of the CTU and its line buffer may be mapped to associated blocks by the following equation:

```
if (offsetY<offsetYUpperCTURow)
{
    offsetY = offsetYUpperCTURow;
}
if (offsetX<offsetXLeftCTUColumn)
{
    offsetX = offsetXLeftCTUColumn;
}
``` where offsetY and offsetX are the location of the non-adjacent block from the current block, and offsetYUpperCTURow and offsetXLeftCTUColumn are the top-left corner of the CTU line buffer.

In some examples, remapping of neighboring blocks may depend on the location of the current block and/or block size. For instance, it is possible that, using the example remapping technique above, more than one non-adjacent neighboring blocks may be remapped to the same block. Thus, video encoder 200 and video decoder 300 may be configured to map the non-adjacent neighboring blocks based on the location of the current block and/or block size. The distance between two non-adjacent neighboring blocks along one particular direction may depend on the location of the current block and/or block size.

In one example, assume the current block has N non-adjacent neighboring blocks along one direction and the location (top left corner) of the current block is (pos_x, pos_y), and the size is (size_x, size_y). The top left corner of the current CTU is (ctu_pos_x, ctu_pos_y), and the size is (ctu_size_x,ctu_size_y). Video encoder 200 and video decoder 300 may remap the N non-adjacent neighboring blocks as follows:

Neighboring block pos_x={pos_x-(pos_x-ctu_pos_x)/N,pos_x-2*(pos_x-ctu_pos_x)/N, . . . pos_x-N*(pos_x-ctu_pos_x)/N}

Neighboring block pos_y={pos_y-(pos_y-ctu_pos_y)/N,pos_y-2*(pos_y-ctu_pos_y)/N, . . . pos_y-N*(pos_y-ctu_pos_y)/N}

FIGS. 23-26 are conceptual diagrams illustrating examples of multiple levels of non-adjacent blocks surrounding a current block that may be used to construct a motion vector predictor candidate list.

Figure 23:
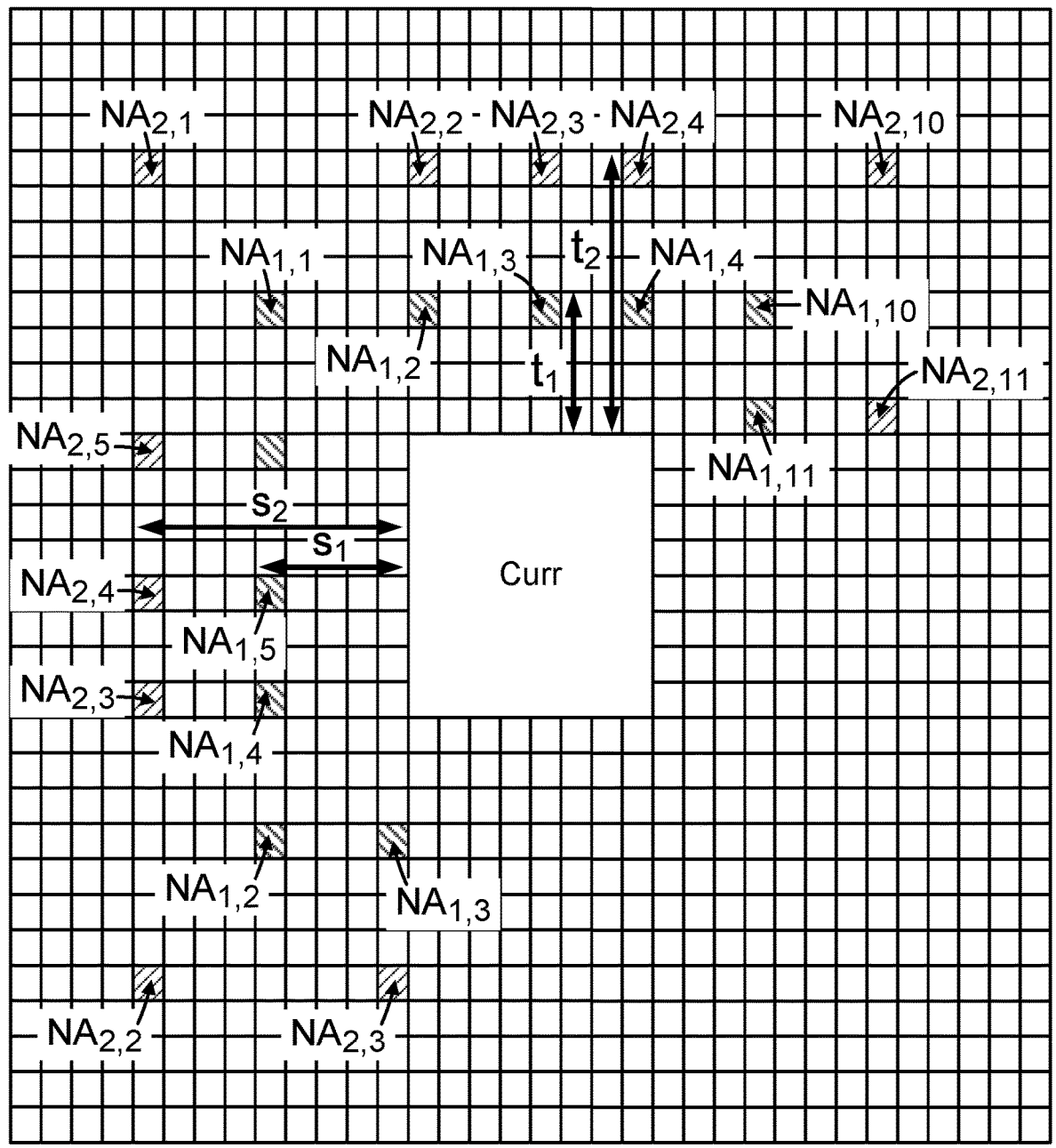
FIG. 23 is a conceptual diagram illustrating an example set of non-adjacent blocks that may be used for a motion vector predictor candidate list.
Figure 24:
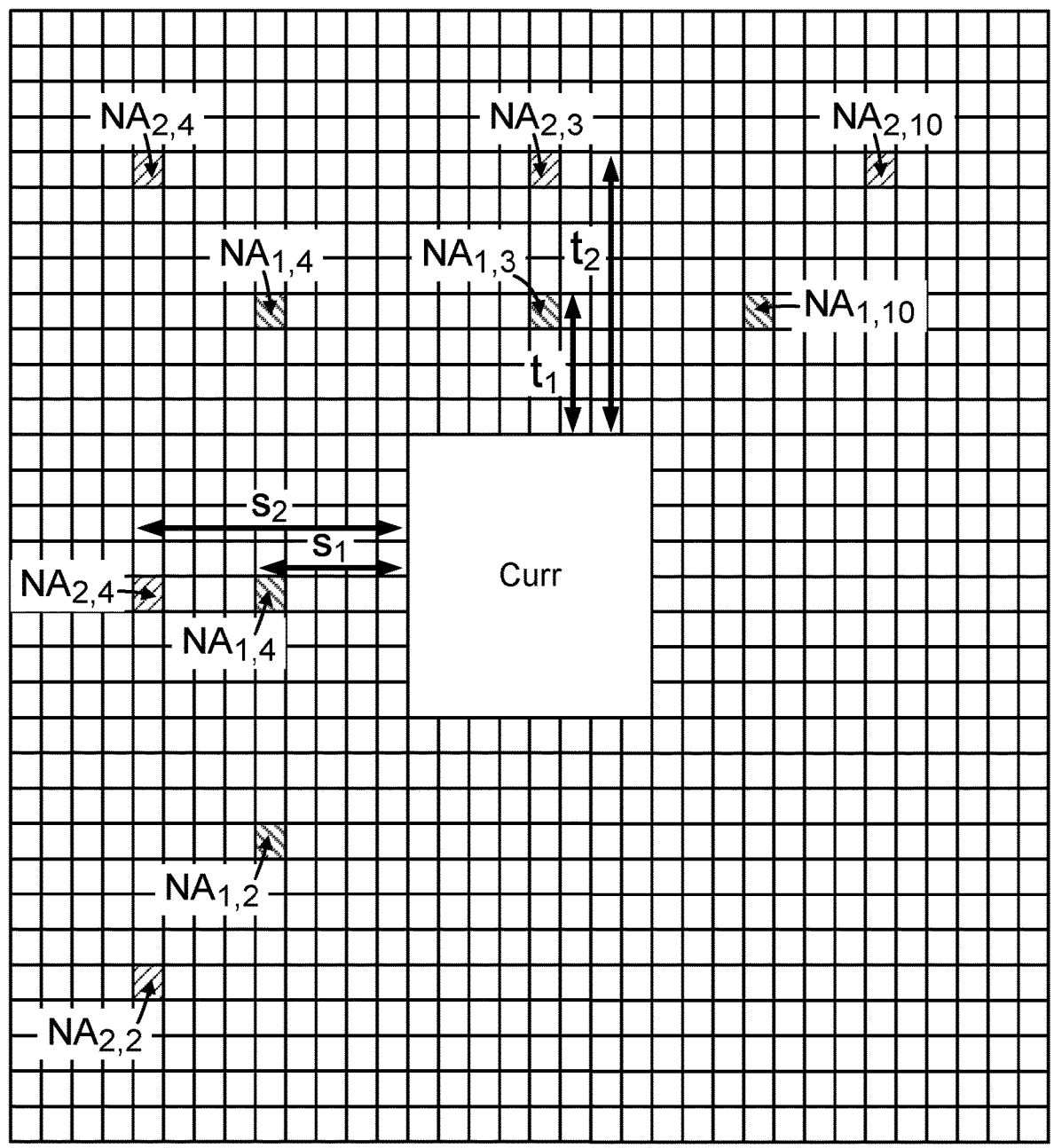
FIG. 24 is a conceptual diagram illustrating an example of selected blocks for use in a motion vector predictor candidate list.
Figure 25:
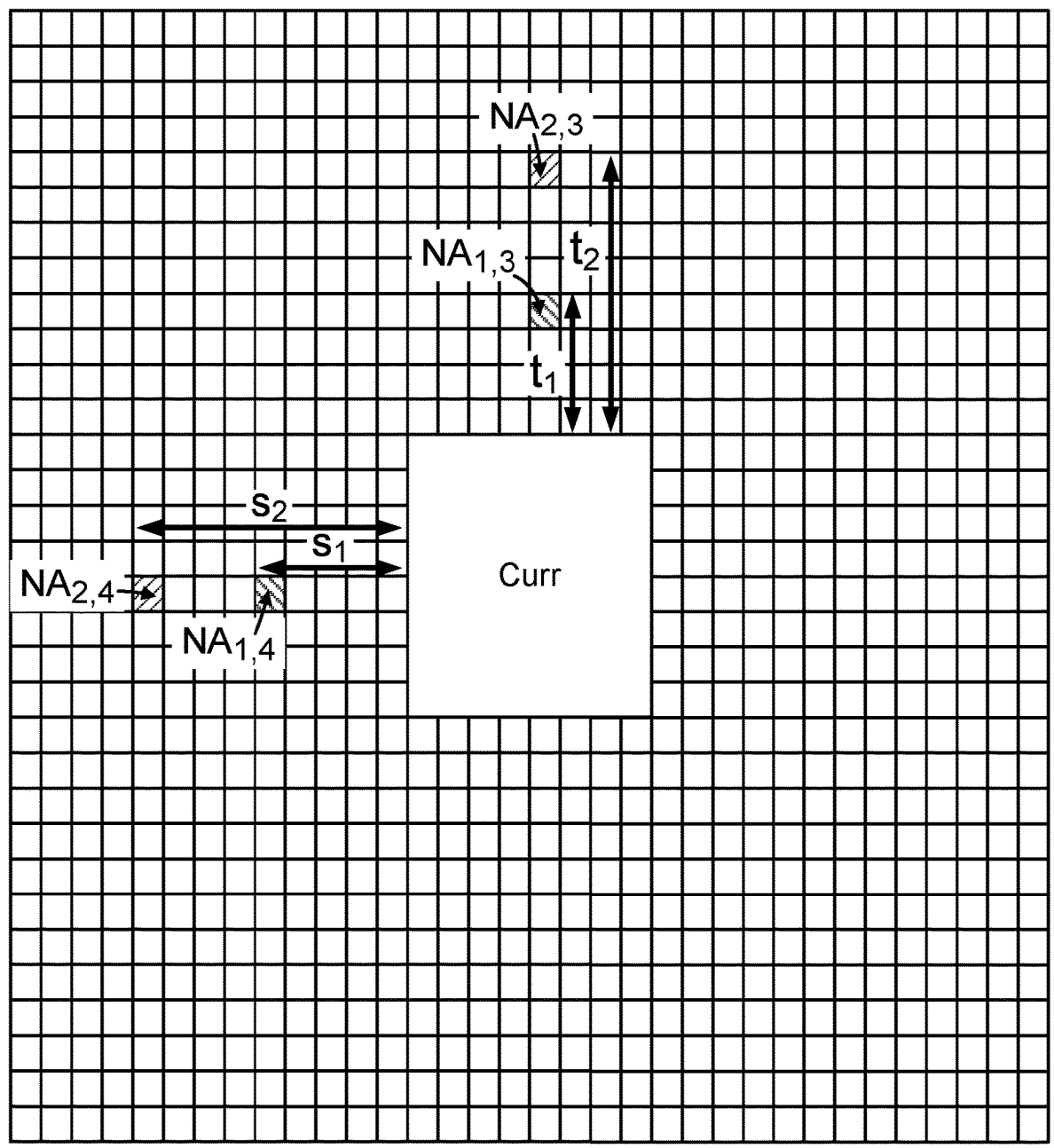
FIG. 25 is a conceptual diagram illustrating another example of selected blocks for use in a motion vector predictor candidate list.

In FIGS. 23-25, each level (i) of non-adjacent blocks is described by respective distance parameters, $s_i$ or $t_i$ from a current block "curr." That is, parameter $s_i$ describes a horizontal distance between current block "curr" and non-adjacent blocks to the sides of the current block, while ti describes a vertical distance between current block "curr" and non-adjacent blocks above or below the current block.

Although FIGS. 23-26 depict two layers of non-adjacent surrounding blocks, the number of layers may be any non-negative integer.

FIG. 23 is a conceptual diagram illustrating an example set of non-adjacent blocks that may be used for a motion vector predictor candidate list. In particular, FIG. 23 depicts one example of multiple level surrounding non-adjacent blocks. In this example, the non-adjacent blocks of layer 1 include blocks at positions (1, 1), (1, 2), (1, 3), (1, 4), (1, 5), (1, 6), (1, 7), (1, 8), (1, 9), (1, 10), and (1, 11), and the non-adjacent blocks of layer 2 include blocks at positions (2, 1), (2, 2), (2, 3), (2, 4), (2, 5), (2, 6), (2, 7), (2, 8), (2, 9), (2, 10), and (2, 11).

FIG. 24 is a conceptual diagram illustrating an example of selected blocks for use in a motion vector predictor candidate list. These blocks are selected from the available set of non-adjacent blocks of FIG. 23. In this example, the selected non-adjacent blocks of layer 1 include blocks at positions (1, 2), (1, 4), (1, 6), (1, 8), and (1, 10), and the selected non-adjacent blocks of layer 2 include blocks at positions (2, 2), (2, 4), (2, 6), (2, 8), and (2, 10).

FIG. 25 is a conceptual diagram illustrating another example of selected blocks for use in a motion vector predictor candidate list. These blocks are selected from the available set of non-adjacent blocks of FIG. 23. In this example, the selected non-adjacent blocks of layer 1 include blocks at positions (1, 4) and (1, 8), and the selected non-adjacent blocks of layer 2 include blocks at positions (2, 4) and (2, 8).

Figure 26:
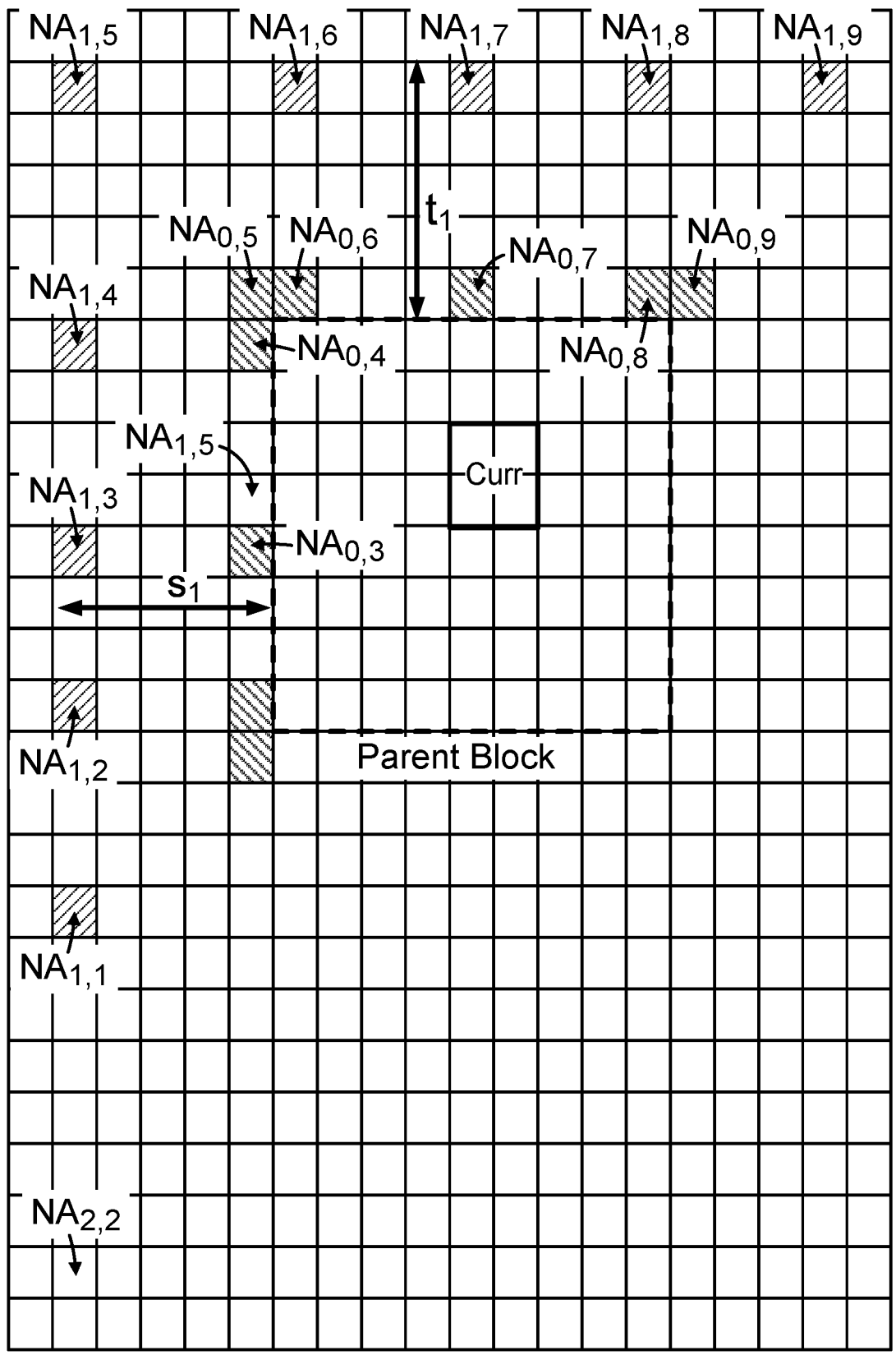
FIG. 26 is a conceptual diagram illustrating another example set of non-adjacent blocks that may be used for a motion vector predictor candidate list based on a parent block.

FIG. 26 is a conceptual diagram illustrating another example set of non-adjacent blocks that may be used for a motion vector predictor candidate list based on a parent block. In FIG. 26, each level (i) of non-adjacent blocks is described by respective distance parameters, $s_i$ or $t_i$ from parent block including a current block "curr." That is, parameter $s_i$ describes a horizontal distance between the parent block and non-adjacent blocks to the sides of the parent block, while ti describes a vertical distance between the parent block and non-adjacent blocks above or below the parent block.

Figure 27:
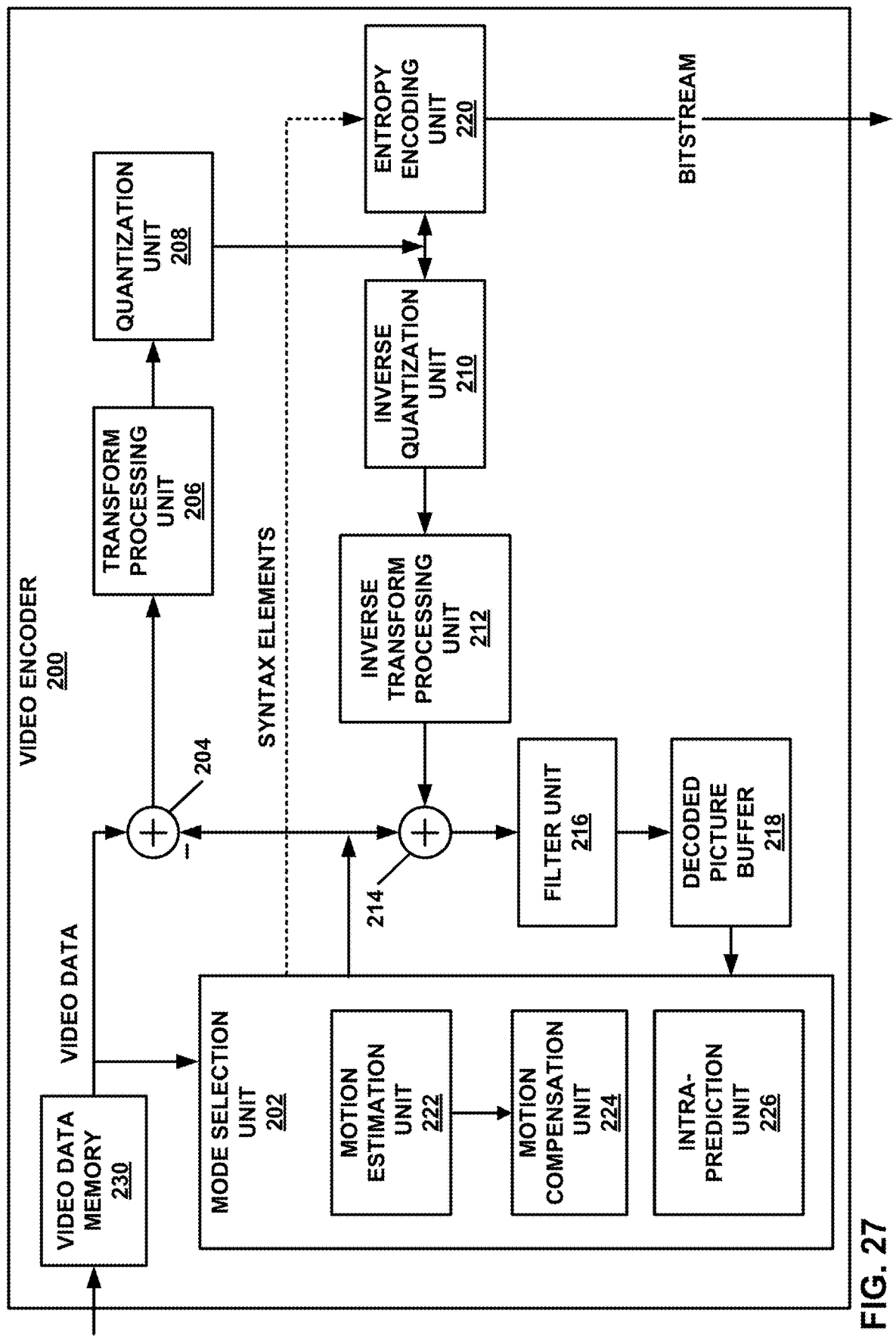
FIG. 27 is a block diagram illustrating an example video encoder that may perform the techniques of this disclosure.

FIG. 27 is a block diagram illustrating an example video encoder 200 that may perform the techniques of this disclosure. FIG. 27 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 27, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 27 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Entropy encoding unit 220 may entropy encode motion information of inter-predicted blocks of video data. For example, entropy encoding unit 220 may use any of the various techniques of this disclosure to construct a motion vector predictor candidate list including motion vectors from non-adjacent blocks to a current block. Entropy encoding unit 220 may ensure that such non-adjacent blocks are within a CTU including the current block and/or a line buffer of DPB 218 including the current block. When the non-adjacent blocks are outside of the CTU and line buffer including the current block, entropy encoding unit 220 may remap such non-adjacent blocks to alternative blocks that are within the CTU or line buffer, as discussed above.

Entropy encoding unit 220 may ultimately select one of the motion vector predictor candidates from the motion vector predictor candidate list to use to encode a motion vector for the current block. In AMVP mode, for example, entropy encoding unit 220 may encode motion parameters including, for example, a candidate index, a motion direction, horizontal and vertical motion vector difference values, a reference picture list identifier, and/or a reference picture index. In merge mode, as another example, entropy encoding unit 220 may encode a candidate index, and the other motion parameters may be inherited from the motion vector predictor candidate.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to construct a motion vector predictor candidate list for a current block of the video data, the motion vector predictor candidate list identifying one or more blocks that are non-adjacent to the current block, each of the non-adjacent blocks being in a coding tree unit (CTU) including the current block or a line buffer including the current block; select a motion vector predictor from one of the blocks that is non-adjacent to the current block and in the motion vector predictor candidate list; and code motion information of the current block using the motion vector predictor.

Figure 28:
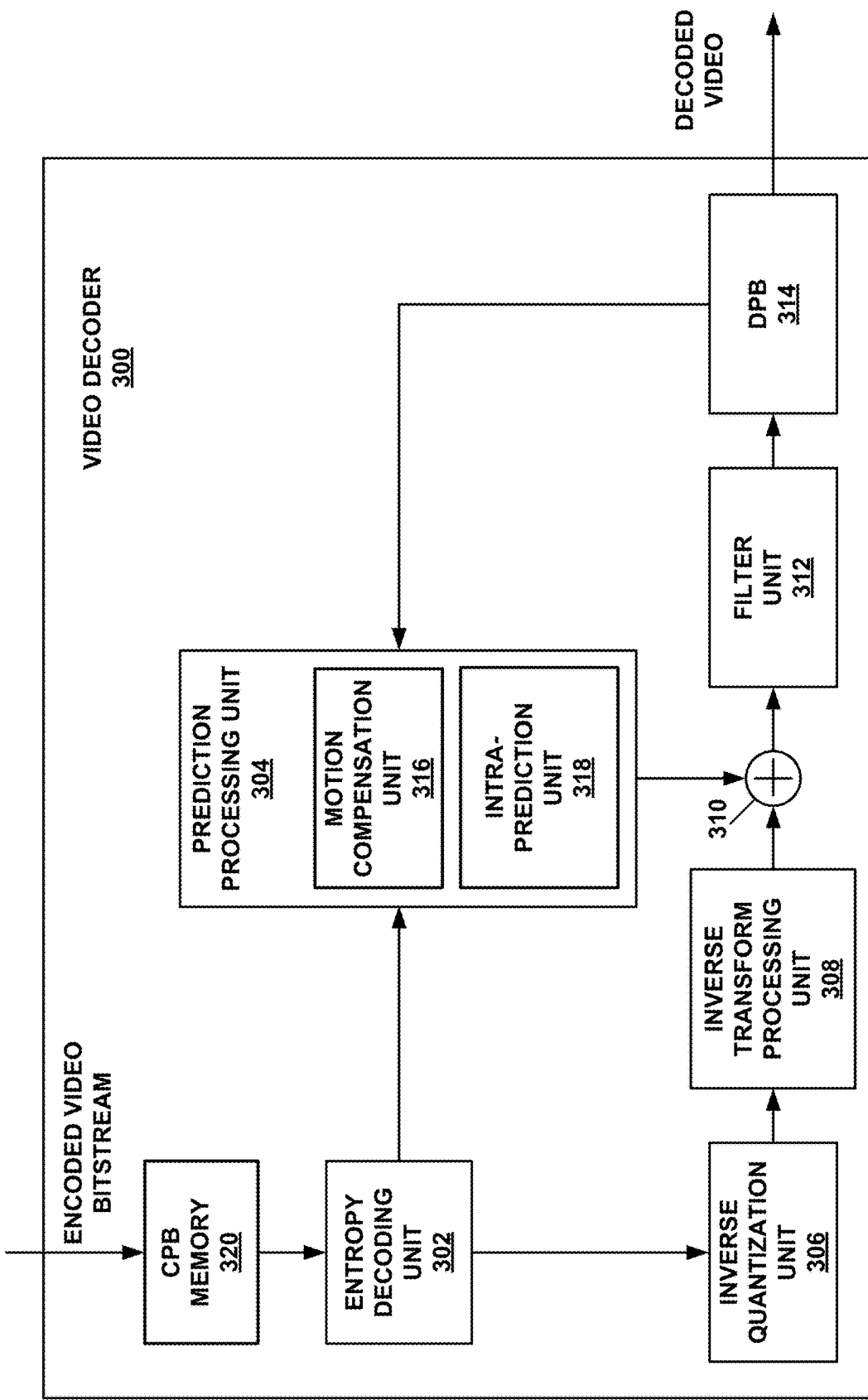
FIG. 28 is a block diagram illustrating an example video decoder that may perform the techniques of this disclosure.

FIG. 28 is a block diagram illustrating an example video decoder 300 that may perform the techniques of this disclosure. FIG. 28 is provided for purposes of explanation and is not limiting on the techniques as broadly exemplified and described in this disclosure. For purposes of explanation, this disclosure describes video decoder 300 according to the techniques of JEM and HEVC. However, the techniques of this disclosure may be performed by video coding devices that are configured to other video coding standards.

In the example of FIG. 28, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

Entropy decoding unit 302 may entropy decode motion information of inter-predicted blocks of video data. For example, entropy decoding unit 302 may use any of the various techniques of this disclosure to construct a motion vector predictor candidate list including motion vectors from non-adjacent blocks to a current block. Entropy decoding unit 302 may ensure that such non-adjacent blocks are within a CTU including the current block and/or a line buffer of DPB 218 including the current block. When the non-adjacent blocks are outside of the CTU and line buffer including the current block, entropy decoding unit 302 may remap such non-adjacent blocks to alternative blocks that are within the CTU or line buffer, as discussed above.

Entropy decoding unit 302 may ultimately decode a candidate index representing one of the motion vector predictor candidates in the motion vector predictor candidate list to use to encode a motion vector for the current block and inherit one or more motion parameters from the candidate. In AMVP mode, for example, entropy decoding unit 302 may retrieve a motion vector predictor from the motion vector predictor candidate, and decode motion parameters including, for example, a candidate index, a motion direction, horizontal and vertical motion vector difference values, a reference picture list identifier, and/or a reference picture index. In merge mode, as another example, entropy decoding unit 302 may inherit the motion parameters from the motion vector predictor candidate indicated by the candidate index. Ultimately, entropy decoding unit 302 may provide the motion parameters to motion compensation unit 316, which may reconstruct one or more motion vectors for an intra-predicted block.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 28 are illustrated to assist with understanding the operations performed by video decoder 300. The units may be implemented as fixed-function circuits, programmable circuits, or a combination thereof. Similar to FIG. 27, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 27).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 27). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to construct a motion vector predictor candidate list for a current block of the video data, the motion vector predictor candidate list identifying one or more blocks that are non-adjacent to the current block, each of the non-adjacent blocks being in a coding tree unit (CTU) including the current block or a line buffer including the current block; select a motion vector predictor from one of the blocks that is non-adjacent to the current block and in the motion vector predictor candidate list; and code motion information of the current block using the motion vector predictor.

Figure 29:
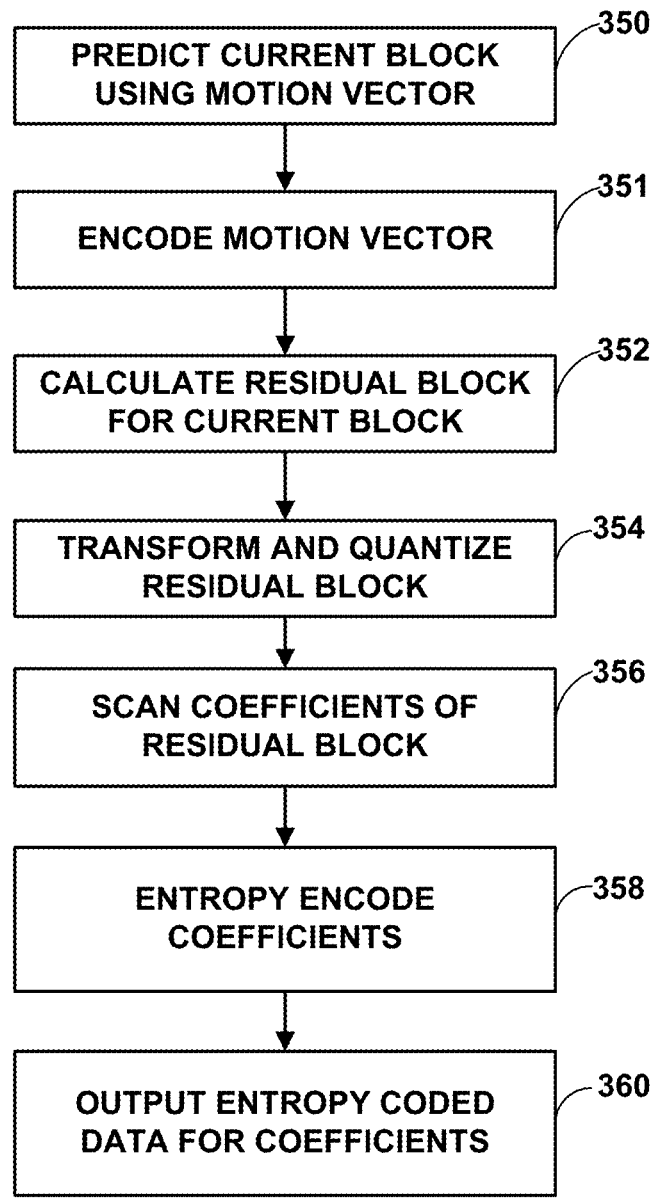
FIG. 29 is a flowchart illustrating an example method for encoding a current block in accordance with the techniques of this disclosure.

FIG. 29 is a flowchart illustrating an example method for encoding a current block in accordance with the techniques of this disclosure. The current block may comprise a current CU. Although described with respect to video encoder 200 (FIGS. 1 and 27), it should be understood that other devices may be configured to perform a method similar to that of FIG. 29.

In this example, video encoder 200 initially predicts the current block using a motion vector (350). For example, video encoder 200 may form a prediction block for the current block using the motion vector, e.g., by retrieving a reference block identified by the motion vector from a previously coded picture. Video encoder 200 may then encode the motion vector using the techniques of this disclosure (351).

For example, video encoder 200 may construct a motion vector predictor candidate list including one or more non-adjacent neighboring blocks that are within a coding tree unit (CTU) and/or line buffer that includes the current block, but excluding non-adjacent neighbors outside the CTU and line buffer. In some examples, video encoder 200 may adjust one or more non-adjacent neighbors outside the CTU and line buffer as discussed above, e.g., by modifying either or both of a top edge and/or left edge such that the non-adjacent neighbors are within the CTU and/or line buffer. Video encoder 200 may then select a motion vector predictor from the motion vector predictor candidate list and encode the motion vector for the current block using the motion vector predictor, e.g., in merge mode or AMVP mode.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

In this manner, the method of FIG. 29 represents an example of a method including constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block; selecting a motion vector predictor from one of the blocks that is non-adjacent to the current block and in the motion vector predictor candidate list; and coding motion information of the current block using the motion vector predictor.

Figure 30:
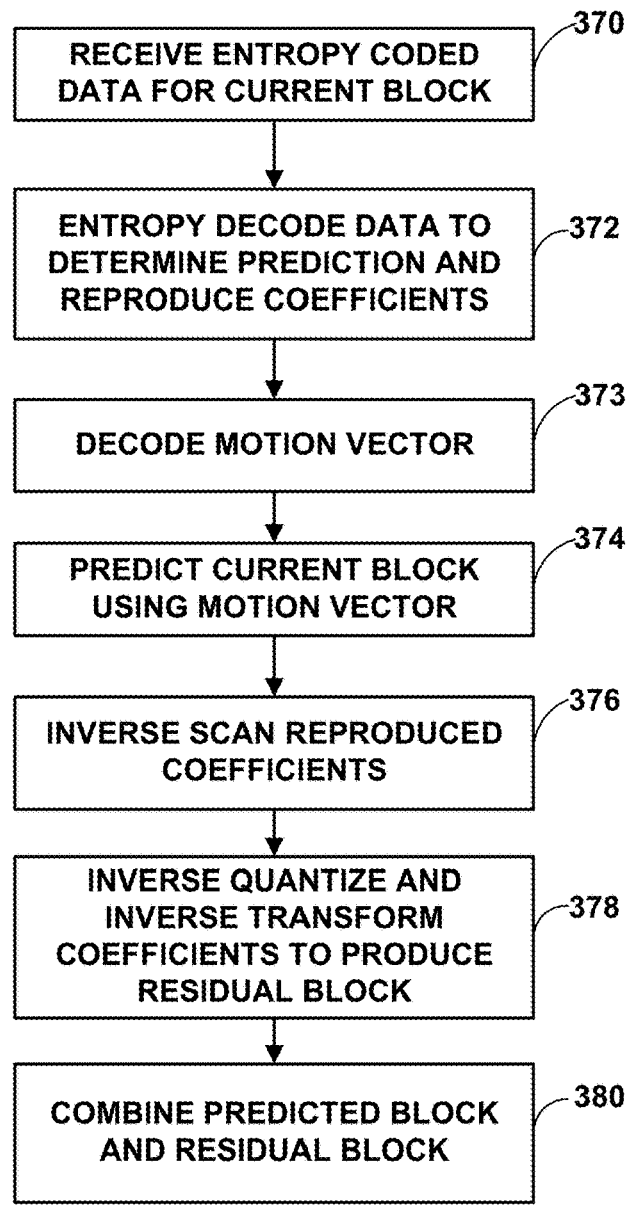
FIG. 30 is a flowchart illustrating an example method for decoding a current block of video data in accordance with the techniques of this disclosure.

FIG. 30 is a flowchart illustrating an example method for decoding a current block of video data in accordance with the techniques of this disclosure. The current block may comprise a current CU. Although described with respect to video decoder 300 (FIGS. 1 and 28), it should be understood that other devices may be configured to perform a method similar to that of FIG. 30.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). In particular, in accordance with the techniques of this disclosure, video decoder 300 may decode a motion vector for the current block using the entropy decoded data (373).

For example, video decoder 300 may construct a motion vector predictor candidate list including one or more non-adjacent neighboring blocks that are within a coding tree unit (CTU) and/or line buffer that includes the current block, but excluding non-adjacent neighbors outside the CTU and line buffer. In some examples, video decoder 300 may adjust one or more non-adjacent neighbors outside the CTU and line buffer as discussed above, e.g., by modifying either or both of a top edge and/or left edge such that the non-adjacent neighbors are within the CTU and/or line buffer. Video decoder 300 may then select a motion vector predictor from the motion vector predictor candidate list (e.g., using a merge index or AMVP index) and reconstruct the motion vector for the current block using the motion vector predictor, e.g., in merge mode or AMVP mode.

Video decoder 300 may predict the current block using the motion vector (374), e.g., using inter-prediction mode to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 30 represents an example of a method including constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block; selecting a motion vector predictor from one of the blocks that is non-adjacent to the current block and in the motion vector predictor candidate list; and coding motion information of the current block using the motion vector predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block, wherein constructing the motion vector predictor candidate list comprises excluding motion information of any blocks that are outside of the CTU and the line buffer from the motion vector predictor candidate list;

selecting a motion vector predictor from one of the blocks that is non-adjacent to the current block and in the motion vector predictor candidate list; and coding motion information of the current block using the motion vector predictor.

2. The method of claim 1, wherein the one of the blocks that is non-adjacent to the current block is within the CTU including the current block.

3. The method of claim 1, wherein the one of the blocks that is non-adjacent to the current block is within the line buffer including the current block.

4. The method of claim 1, wherein constructing the motion vector predictor candidate list and excluding the motion information of any of the blocks that are outside of the CTU and the line buffer comprises:

determining that a potential motion vector predictor is outside of the CTU and the line buffer;

remapping the potential motion vector predictor to a motion vector predictor candidate within the CTU or the line buffer; and adding the remapped motion vector predictor candidate to the motion vector predictor candidate list.

5. The method of claim 4, wherein remapping comprises, when a vertical offset of the potential motion vector predictor is less than a vertical offset of an upper row including the CTU, setting a vertical offset of the remapped motion vector predictor candidate equal to the vertical offset of the upper row including the CTU.

6. The method of claim 5, wherein the vertical offset of the potential motion vector predictor comprises offsetY, and wherein the vertical offset of the upper row including the CTU comprises offsetYUpperCTURow.

7. The method of claim 4, wherein remapping comprises, when a horizontal offset of the potential motion vector predictor is less than a horizontal offset of a left column including the CTU, setting a horizontal offset of the remapped motion vector predictor candidate equal to the horizontal offset of the left column including the CTU.

8. The method of claim 7, wherein the horizontal offset of the potential motion vector predictor comprises offsetY, and wherein the horizontal offset of the left column including the CTU comprises offsetXLeftCTUColumn.

9. The method of claim 4, wherein the potential motion vector predictor comprises one of a plurality of potential motion vector predictors along a common direction from the current block that are outside of the CTU and the line buffer, and wherein remapping the potential motion vector predictor comprises remapping each of the plurality of potential motion vector predictors, comprising at least one of:

setting left edges of the remapped motion vector predictors equal to {pos_x−(pos_x−ctu_pos_x)/N, pos_x−2*(pos_x−ctu_pos_x)/N, pos_x−N*(pos_x−ctu_pos_x)/N}, wherein pos_x comprises a left edge of the current block, ctu_pos_x comprises a left edge of the CTU, and N is the number of potential motion vector predictors in the plurality of potential motion vector predictors; or setting top edges of the remapped motion vector predictors equal to {pos_y−(pos_y−ctu_pos_y)/N, pos_y−2*(pos_y−ctu_pos_y)/N, . . . pos_y−N*(pos_y−ctu_pos_y)/N}, wherein pos_y comprises a top edge of the current block, and ctu_pos_y comprises a top edge of the CTU.

10. The method of claim 1, wherein coding the motion information comprises inheriting one or more motion parameters for the current block from the from the motion vector predictor, the motion parameters comprising one or more of an x-value of a motion vector, a y-value of the motion vector, a reference picture list identifier, or a reference picture index.

11. The method of claim 1, wherein coding the motion information comprises decoding the motion information, the method further comprising:

generating a prediction block for the current block using the motion information;

decoding a residual block for the current block; and combining the residual block with the prediction block to reconstruct the current block.

12. The method of claim 1, wherein coding the motion information comprises encoding the motion information, the method further comprising:

generating a prediction block for the current block using the motion information;

calculating a residual block for the current block representing differences between the current block and the prediction block; and encoding the residual block.

13. A device for coding video data, the device comprising:

a memory configured to store video data; and one or more processors implemented in circuitry and configured to:

construct a motion vector predictor candidate list for a current block of the video data, the motion vector predictor candidate list identifying one or more blocks that are non-adjacent to the current block, each of the non-adjacent blocks being in a coding tree unit (CTU) including the current block or a line buffer including the current block wherein the one or more processors are configured to exclude motion information of any blocks that are outside of the CTU and the line buffer from the motion vector predictor candidate list;

select a motion vector predictor from one of the blocks that is non-adjacent to the current block and in the motion vector predictor candidate list; and code motion information of the current block using the motion vector predictor.

14. The device of claim 13, wherein the one of the blocks that is non-adjacent to the current block is within the CTU including the current block.

15. The device of claim 13, wherein the one of the blocks that is non-adjacent to the current block is within the line buffer including the current block.

16. The device of claim 13, wherein to construct the motion vector predictor candidate list and exclude the motion information of any of the blocks that are outside of the CTU and the line buffer from the motion vector predictor candidate list, the one or more processors are configured to:

determine that a potential motion vector predictor is outside of the CTU and the line buffer;

remap the potential motion vector predictor to a motion vector predictor candidate within the CTU or the line buffer; and add the remapped motion vector predictor candidate to the motion vector predictor candidate list.

17. The device of claim 16, wherein to remap the potential motion vector predictor, the one or more processors are configured to, when a vertical offset of the potential motion vector predictor is less than a vertical offset of an upper row including the CTU, set a vertical offset of the remapped motion vector predictor candidate equal to the vertical offset of the upper row including the CTU.

18. The device of claim 16, wherein to remap the potential motion vector predictor, the one or more processors are configured to, when a horizontal offset of the potential motion vector predictor is less than a horizontal offset of a left column including the CTU, set a horizontal offset of the remapped motion vector predictor candidate equal to the horizontal offset of the left column including the CTU.

19. The device of claim 16, wherein the potential motion vector predictor comprises one of a plurality of potential motion vector predictors along a common direction from the current block that are outside of the CTU and the line buffer, and wherein to remap the potential motion vector predictor, the one or more processors are configured to remap each of the plurality of potential motion vector predictors, and wherein to remap each of the plurality of potential motion vector predictors, the one or more processors are configured to:
  set left edges of the remapped motion vector predictors equal to {pos_x−(pos_x−ctu_pos_x)/N, pos_x−2*(pos_x−ctu_pos_x)/N, pos_x−N*(pos_x−ctu_pos_x)/N}, wherein pos_x comprises a left edge of the current block, ctu_pos_x comprises a left edge of the CTU, and N is the number of potential motion vector predictors in the plurality of potential motion vector predictors; or
  set top edges of the remapped motion vector predictors equal to {pos_y−(pos_y−ctu_pos_y)/N, pos_y−2*(pos_y−ctu_pos_y)/N, . . . pos_y−N*(pos_y−ctu_pos_y)/N}, wherein pos_y comprises a top edge of the current block, and ctu_pos_y comprises a top edge of the CTU.

20. The device of claim 13, wherein the one or more processors are configured to inherit one or more motion parameters for the current block from the from the motion vector predictor, the motion parameters comprising one or more of an x-value of a motion vector, a y-value of the motion vector, a reference picture list identifier, or a reference picture index.

21. The device of claim 13, wherein the one or more processors are configured to decode the motion information and further configured to:
  generate a prediction block for the current block using the motion information;
  decode a residual block for the current block; and
  combine the residual block with the prediction block to reconstruct the current block.

22. The device of claim 13, wherein the one or more processors are configured to encode the motion information and further configured to:
  generate a prediction block for the current block using the motion information;
  calculate a residual block for the current block representing differences between the current block and the prediction block; and
  encode the residual block.

23. The device of claim 13, further comprising a display configured to display the video data.

24. The device of claim 13, further comprising a camera configured to capture the video data.

25. The device of claim 13, wherein the device comprises one or more of a camera, a computer, a mobile device, a broadcast receiver device, or a set-top box.

26. The device of claim 13, wherein the device comprises at least one of:
  an integrated circuit;
  a microprocessor; or
  a wireless communication device.

27. A non-transitory computer-readable storage medium having stored thereon instructions that, when executed, cause a processor to:
  construct a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block, wherein the instructions that cause the processor to construct the motion vector predictor candidate list comprise instructions that cause the processor to exclude motion information of any blocks that are outside of the CTU and the line buffer from the motion vector predictor candidate list;
  select a motion vector predictor from one of the blocks that is non-adjacent to the current block and in the motion vector predictor candidate list; and
  code motion information of the current block using the motion vector predictor.

28. A device for coding video data, the device comprising:
  means for constructing a motion vector predictor candidate list for a current block of video data, the motion vector predictor candidate list identifying one or more blocks that are non-adjacent to the current block, each of the non-adjacent blocks being in a coding tree unit (CTU) including the current block or a line buffer including the current block, wherein the means for constructing the motion vector predictor candidate list comprises means for excluding motion information of any blocks that are outside of the CTU and the line buffer from the motion vector predictor candidate list;
  means for selecting a motion vector predictor from one of the blocks that is non-adjacent to the current block and in the motion vector predictor candidate list; and
  means for coding motion information of the current block using the motion vector predictor.

* * * * *